United States Patent
Mathew et al.

(10) Patent No.: US 9,928,036 B2
(45) Date of Patent: Mar. 27, 2018

(54) RANDOM NUMBER GENERATOR

(71) Applicant: Intel Corporation, Santa Clara, CA (US)

(72) Inventors: Sanu K. Mathew, Hillsboro, OR (US);
David Johnston, Beaverton, OR (US);
Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 14/865,009

(22) Filed: Sep. 25, 2015

(65) Prior Publication Data
US 2017/0090872 A1  Mar. 30, 2017

(51) Int. Cl.
G06F 7/58 (2006.01)

(52) U.S. Cl.
CPC .......... *G06F 7/588* (2013.01); *G06F 2207/58* (2013.01)

(58) Field of Classification Search
USPC ................................................ 708/250–256
See application file for complete search history.

(56) References Cited

U.S. PATENT DOCUMENTS

| 5,446,683 | A | * | 8/1995 | Mullen | ............ | G01R 31/31813 |
| | | | | | | 708/256 |
| 5,570,307 | A | * | 10/1996 | Takahashi | ................ | G06F 1/02 |
| | | | | | | 331/78 |
| 2014/0059100 | A1 | * | 2/2014 | Liberty | .................... | G06F 7/58 |
| | | | | | | 708/250 |

FOREIGN PATENT DOCUMENTS

WO  WO 2013101101 A1 * 7/2013 ........... H04L 9/0662

OTHER PUBLICATIONS

Sanu K. Mathew, 2.4 Gbps 7 mW All-Digital PVT-Variation Tolerant True Random Number Generator for 45 nm CMOS High-Performance Microprocessors, Nov. 2012.*
S. K. Mathew, et. al. "2.4Gbps, 7mW All-digital PVT-Variation Tolerant True Random Number Generator 45nm; CMOS High-Performance Microprocessors," *IEEE Journal of Solid-State Circuits*, v.47, No. 11, pp. 2807-2821, Nov. 2012.

* cited by examiner

*Primary Examiner* — Michael D. Yaary
(74) *Attorney, Agent, or Firm* — Alliance IP, LLC

(57) ABSTRACT

A processor includes an execution unit to generate a random number. The execution unit includes entropy source circuits, correlation circuits, and an extractor circuit. The entropy source circuits include all-digital components and are to generate an initial randomized bit stream. The correlation circuits are to remove correlations from the initial randomized bit stream to yield an intermediate randomized bit stream. The extractor circuit is to select a subset of the intermediate randomized bit stream as a random output of the execution unit.

20 Claims, 20 Drawing Sheets

RANDOM NUMBER GENERATOR

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. Processors may utilize analog sources for creating random numbers in response to random number software instructions. Furthermore, processors may utilize lookup tables for creating random numbers. Also, processors may use probability density functions to generate random numbers. A statistical test for randomness may be used to characterize the output of a random number generator as a "true" random number generator.

DESCRIPTION OF THE FIGURES

Embodiments are illustrated by way of example and not limitation in the Figures of the accompanying drawings.

DETAILED DESCRIPTION

Figure 1A:
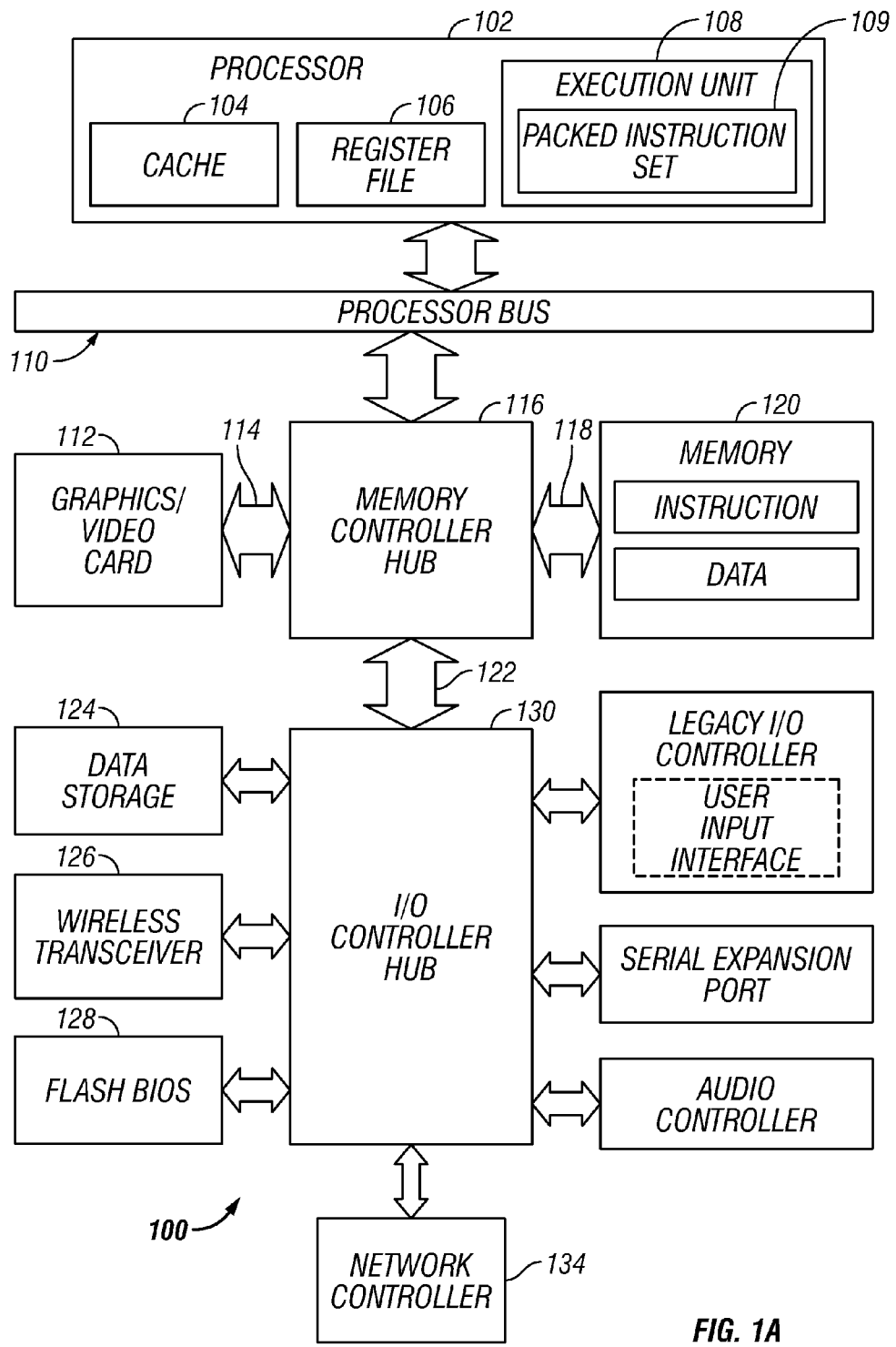
FIG. 1A is a block diagram of an exemplary computer system formed with a processor that may include execution units to execute an instruction, in accordance with embodiments of the present disclosure.

The following description describes an instruction and processing logic for nearest neighbor units and calculation. The instruction and processing logic may be implemented on an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a Dynamic Random Access Memory (DRAM) device, a Static Random Access Memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
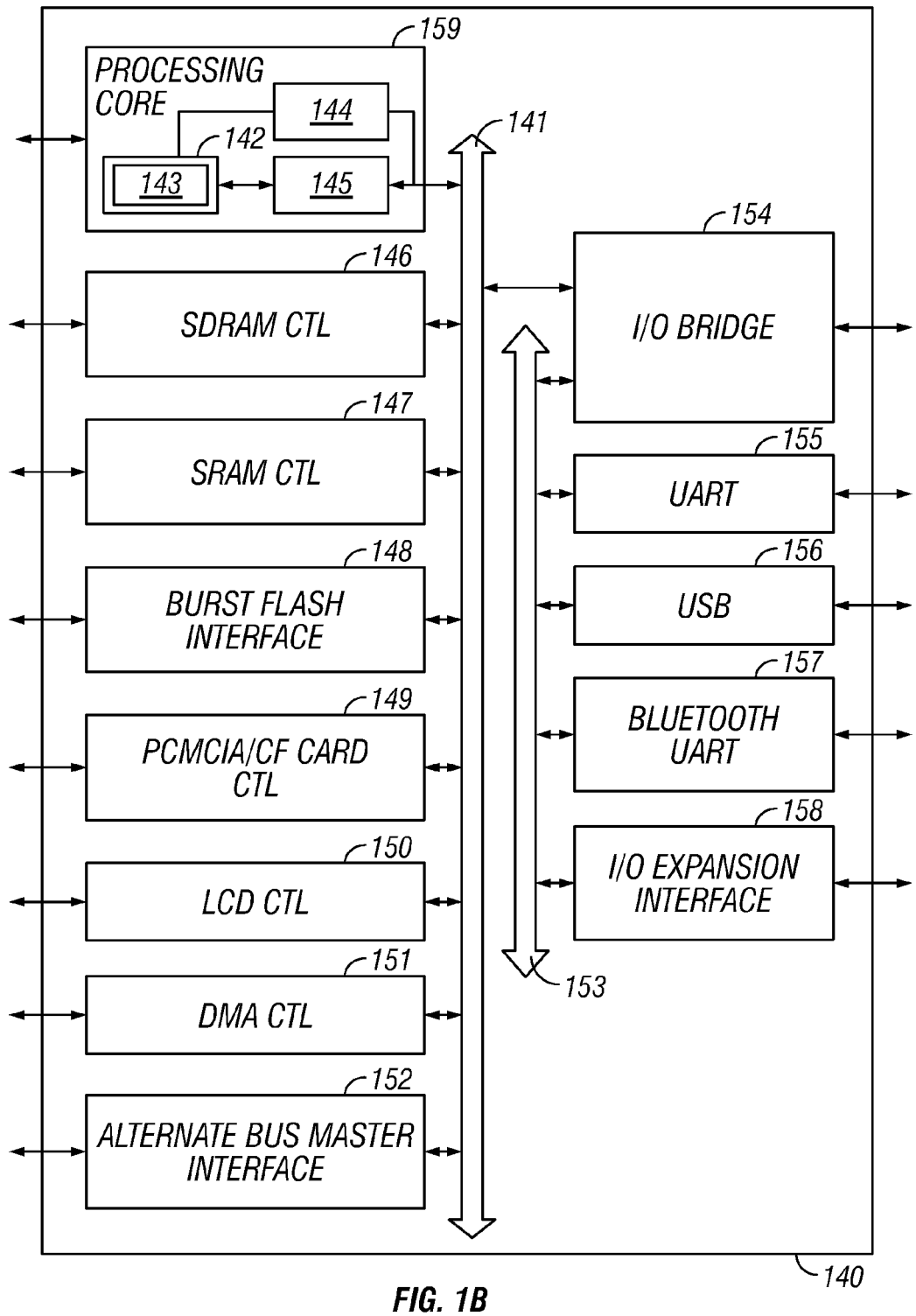
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW-type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, Synchronous Dynamic Random Access Memory (SDRAM) control 146, Static Random Access Memory (SRAM) control 147, burst flash memory interface 148, Personal Computer Memory Card International Association (PCMCIA)/Compact Flash (CF) card control 149, Liquid Crystal Display (LCD) control 150, Direct Memory Access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, Universal Asynchronous Receiver/Transmitter (UART) 155, Universal Serial Bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
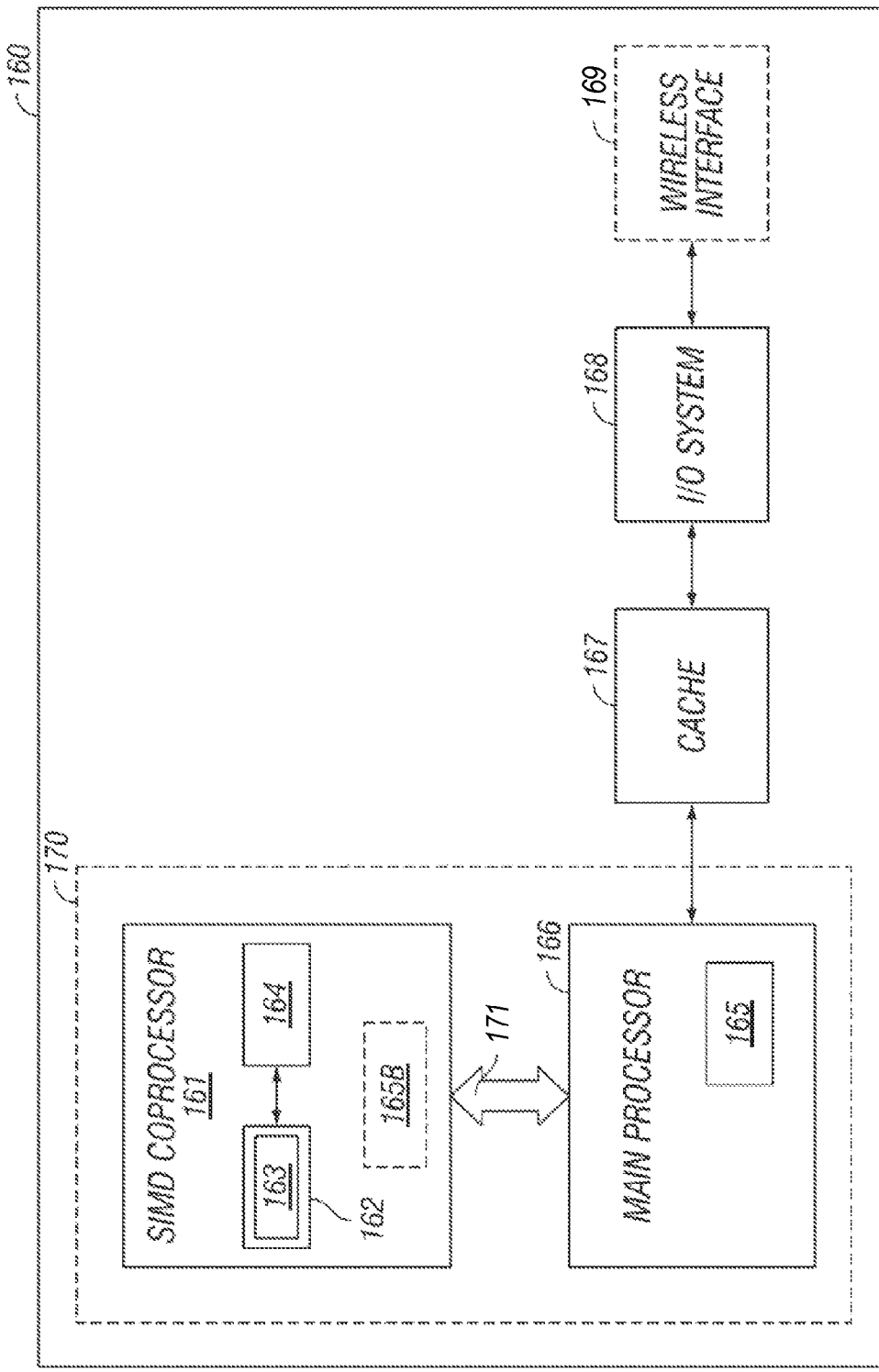
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
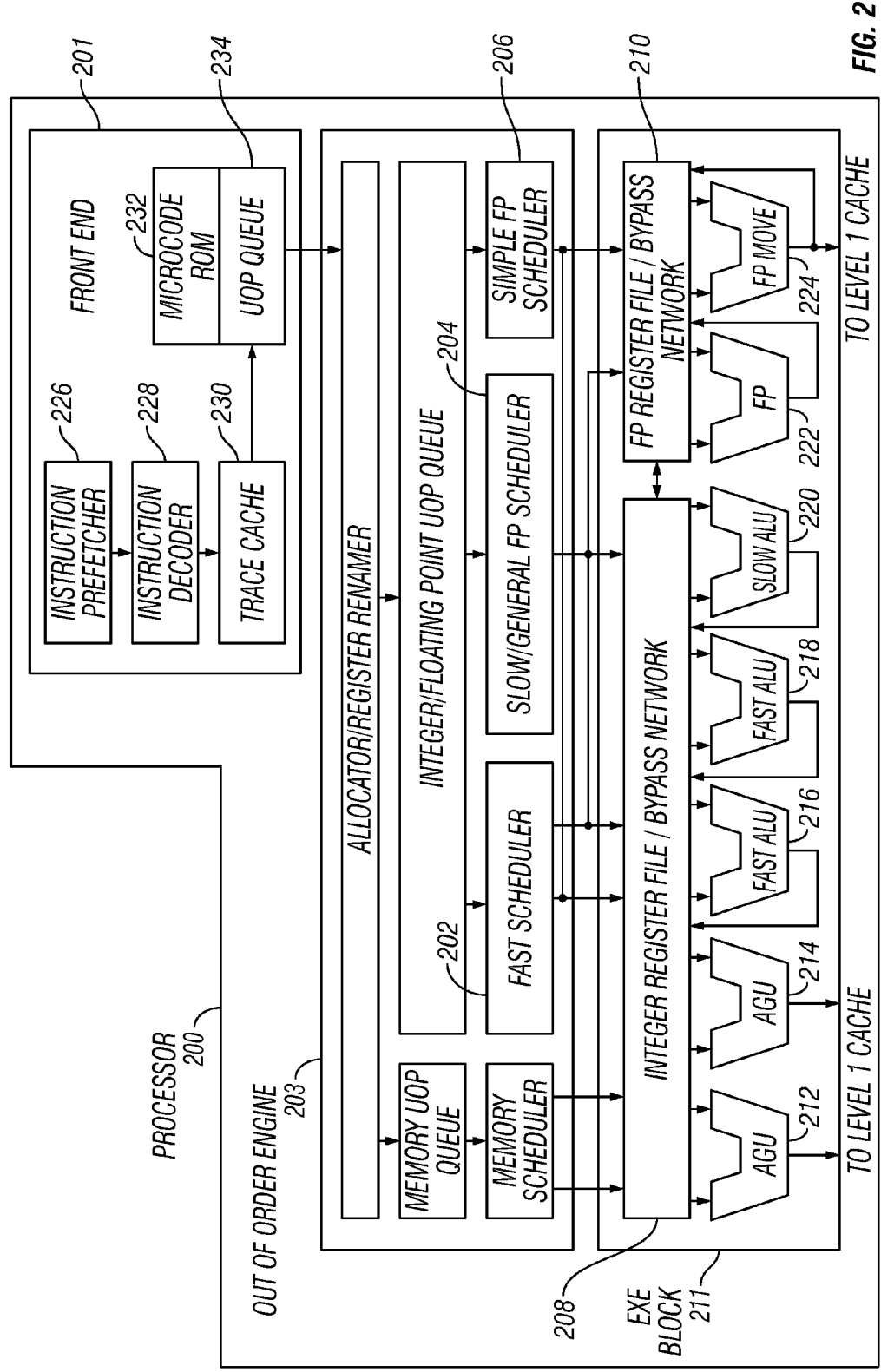
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro-ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast Arithmetic Logic Unit (ALU) 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
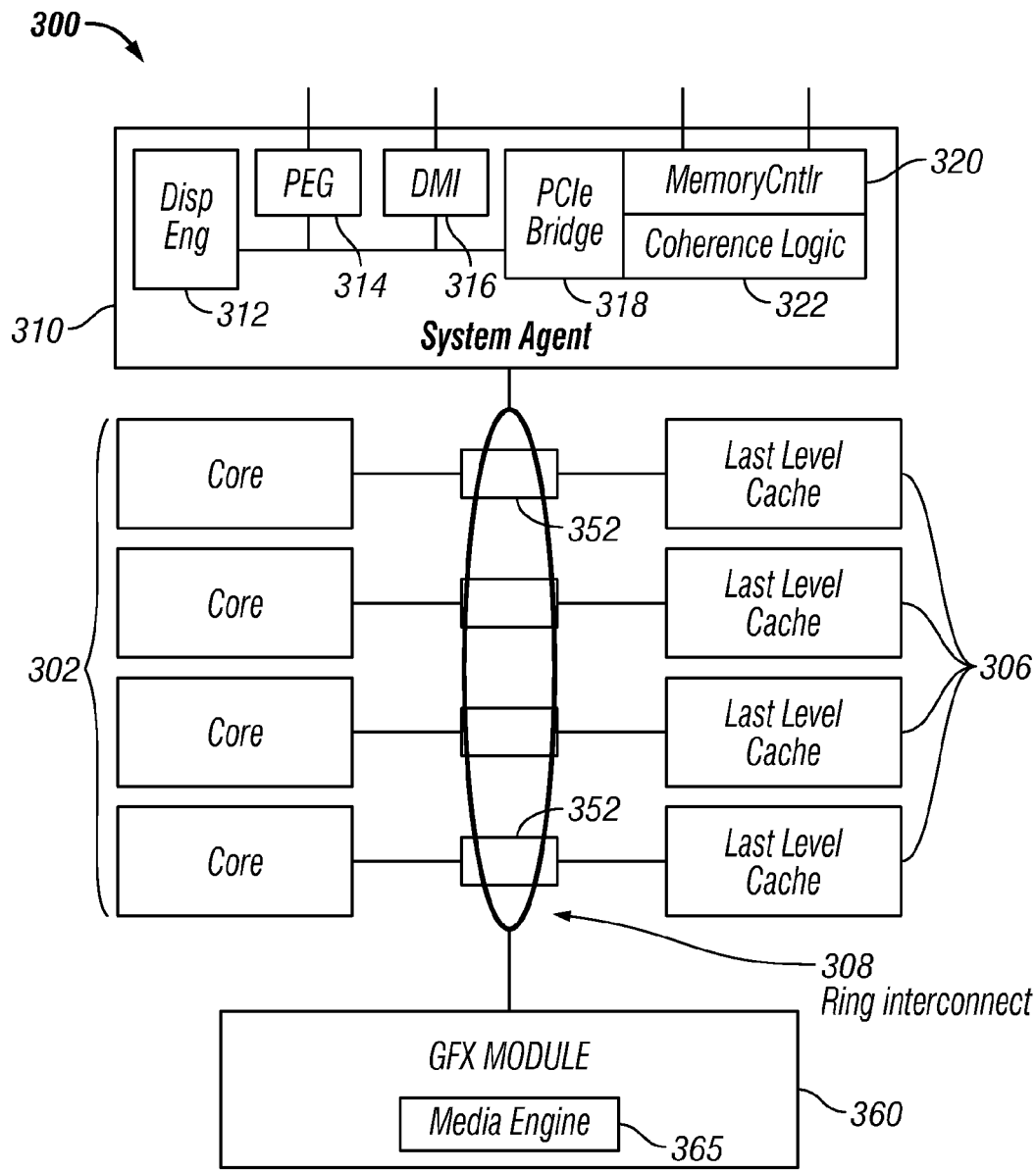
FIG. 3A is a block diagram of a processor, in accordance with embodiments of the present disclosure.
Figure 3B:
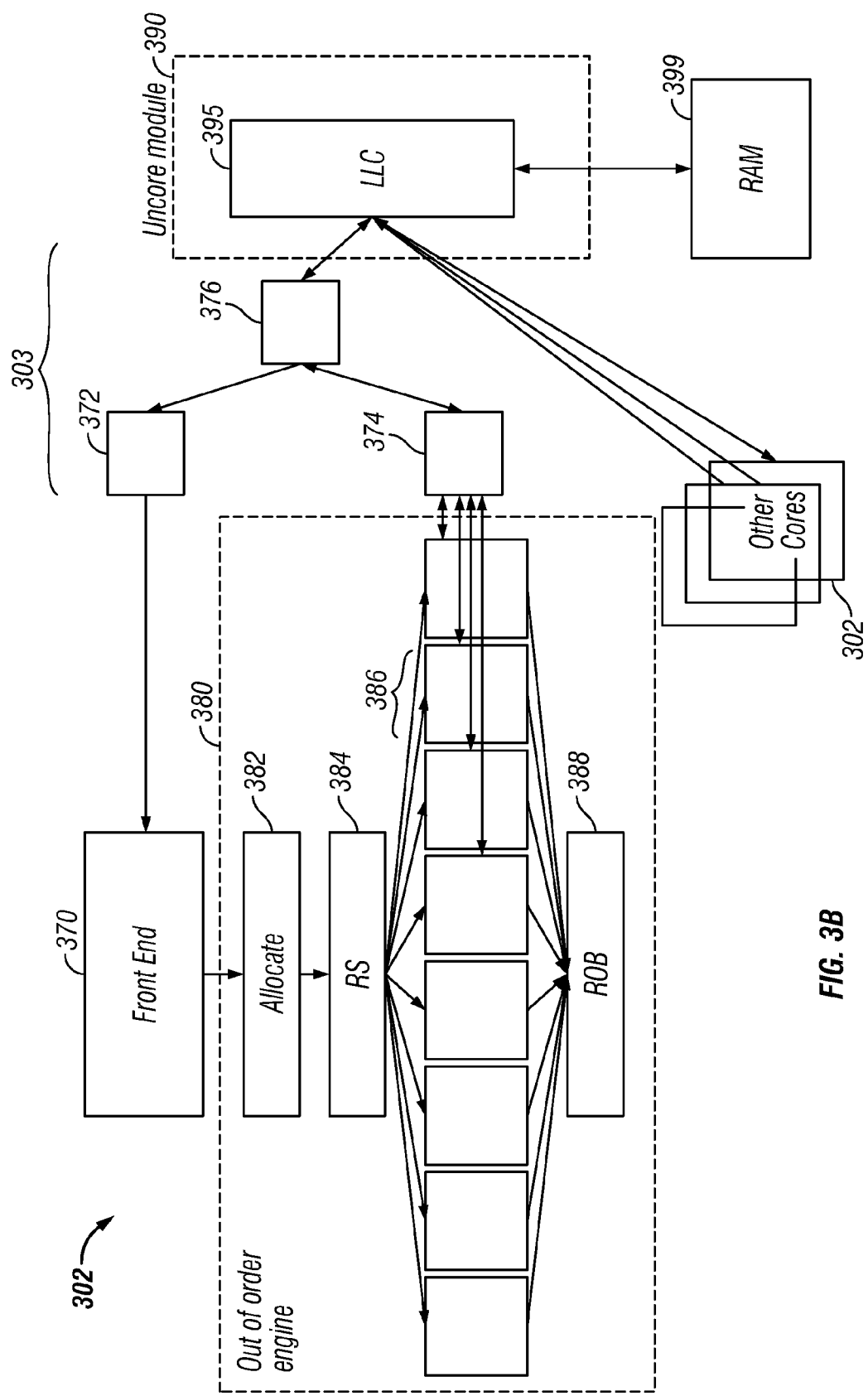
FIG. 3B is a block diagram of an example implementation of a core, in accordance with embodiments of the present disclosure.
Figure 4:
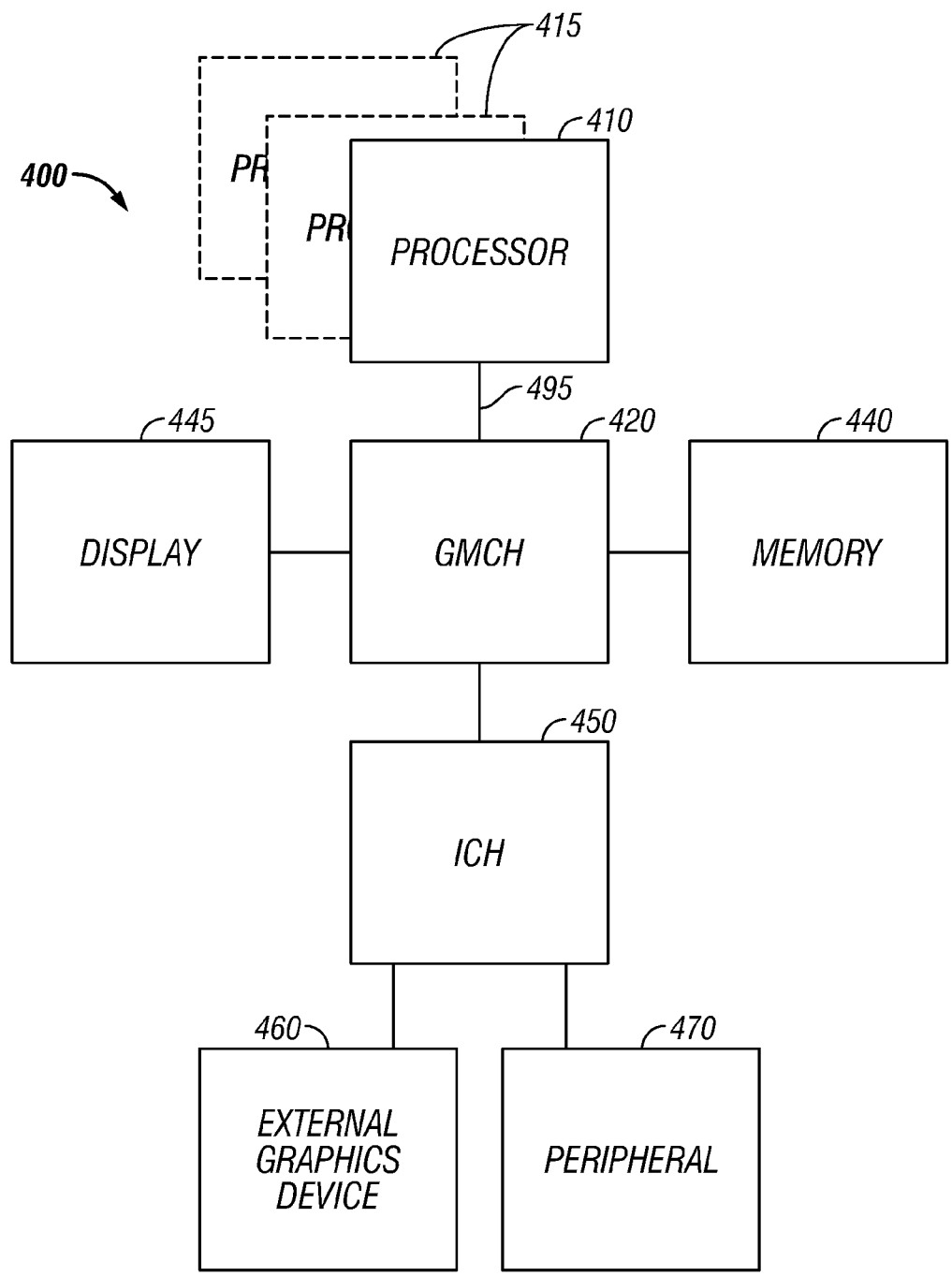
FIG. 4 is a block diagram of a system, in accordance with embodiments of the present disclosure.
Figure 5:
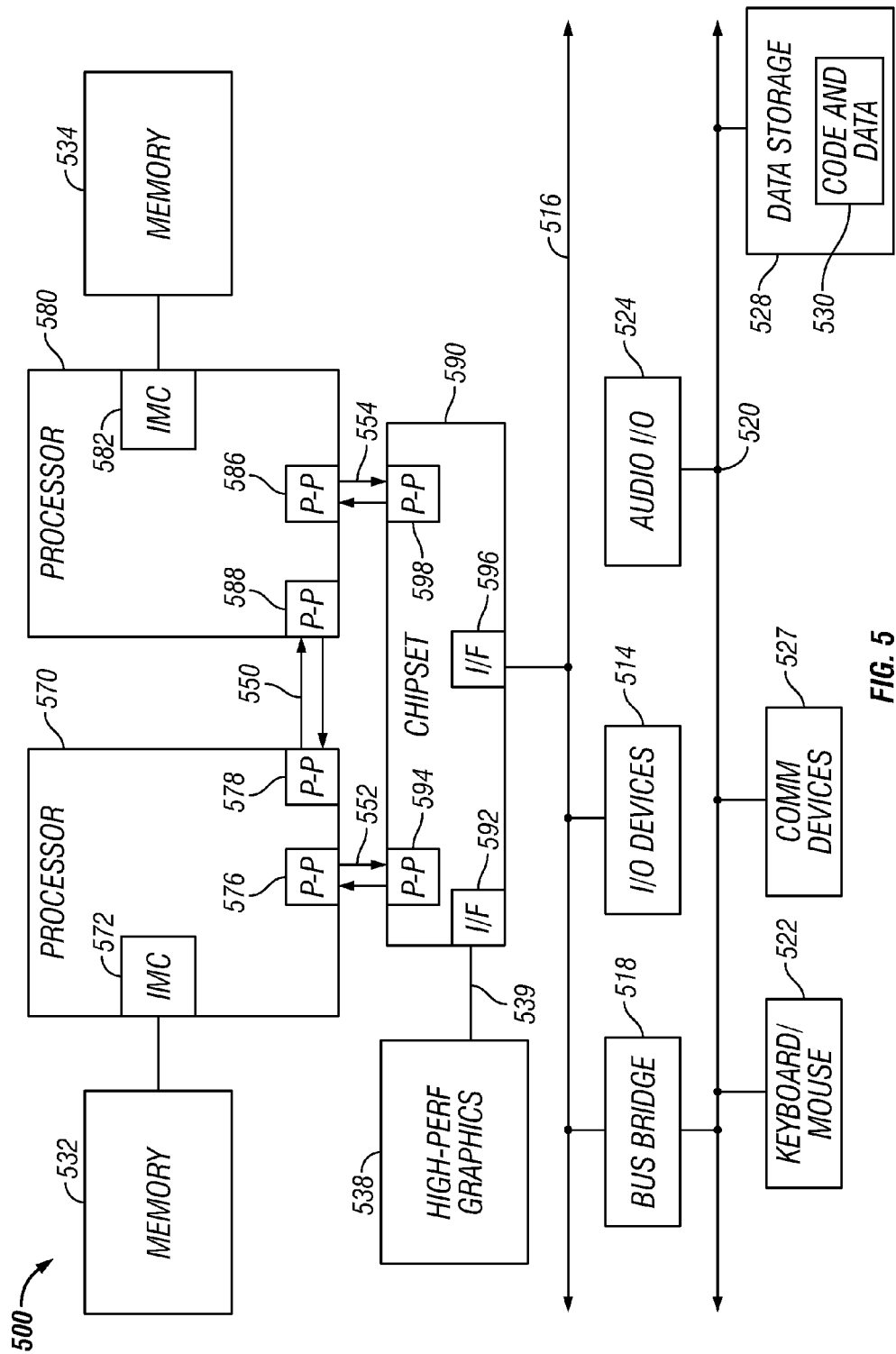
FIG. 5 is a block diagram of a second system, in accordance with embodiments of the present disclosure.

FIGS. 3-5 may illustrate exemplary systems suitable for including processor 300, while FIG. 4 may illustrate an exemplary System on a Chip (SoC) that may include one or more of cores 302. Other system designs and implementations known in the arts for laptops, desktops, handheld PCs, personal digital assistants, engineering workstations, servers, network devices, network hubs, switches, embedded processors, DSPs, graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 4 illustrates a block diagram of a system 400, in accordance with embodiments of the present disclosure. System 400 may include one or more processors 410, 415, which may be coupled to Graphics Memory Controller Hub (GMCH) 420. The optional nature of additional processors 415 is denoted in FIG. 4 with broken lines.

Each processor 410, 415 may be some version of processor 300. However, it should be noted that integrated graphics logic and integrated memory control units might not exist in processors 410, 415. FIG. 4 illustrates that GMCH 420 may be coupled to a memory 440 that may be, for example, a dynamic random access memory (DRAM). The DRAM may, for at least one embodiment, be associated with a non-volatile cache.

GMCH 420 may be a chipset, or a portion of a chipset. GMCH 420 may communicate with processors 410, 415 and control interaction between processors 410, 415 and memory 440. GMCH 420 may also act as an accelerated bus interface between the processors 410, 415 and other elements of system 400. In one embodiment, GMCH 420 communicates with processors 410, 415 via a multi-drop bus, such as a frontside bus (FSB) 495.

Furthermore, GMCH 420 may be coupled to a display 445 (such as a flat panel display). In one embodiment, GMCH 420 may include an integrated graphics accelerator. GMCH 420 may be further coupled to an input/output (I/O) controller hub (ICH) 450, which may be used to couple various peripheral devices to system 400. External graphics device 460 may include be a discrete graphics device coupled to ICH 450 along with another peripheral device 470.

In other embodiments, additional or different processors may also be present in system 400. For example, additional processors 410, 415 may include additional processors that may be the same as processor 410, additional processors that may be heterogeneous or asymmetric to processor 410, accelerators (such as, e.g., graphics accelerators or digital signal processing (DSP) units), field programmable gate arrays, or any other processor. There may be a variety of differences between the physical resources 410, 415 in terms of a spectrum of metrics of merit including architectural, micro-architectural, thermal, power consumption characteristics, and the like. These differences may effectively manifest themselves as asymmetry and heterogeneity amongst processors 410, 415. For at least one embodiment, various processors 410, 415 may reside in the same die package.

FIG. 5 illustrates a block diagram of a second system 500, in accordance with embodiments of the present disclosure. As shown in FIG. 5, multiprocessor system 500 may include a point-to-point interconnect system, and may include a first processor 570 and a second processor 580 coupled via a point-to-point interconnect 550. Each of processors 570 and 580 may be some version of processor 300 as one or more of processors 410,615.

While FIG. 5 may illustrate two processors 570, 580, it is to be understood that the scope of the present disclosure is not so limited. In other embodiments, one or more additional processors may be present in a given processor.

Processors 570 and 580 are shown including integrated memory controller units 572 and 582, respectively. Processor 570 may also include as part of its bus controller units point-to-point (P-P) interfaces 576 and 578; similarly, second processor 580 may include P-P interfaces 586 and 588. Processors 570, 580 may exchange information via a point-to-point (P-P) interface 550 using P-P interface circuits 578, 588. As shown in FIG. 5, IMCs 572 and 582 may couple the processors to respective memories, namely a memory 532 and a memory 534, which in one embodiment may be portions of main memory locally attached to the respective processors.

Processors 570, 580 may each exchange information with a chipset 590 via individual P-P interfaces 552, 554 using point to point interface circuits 576, 594, 586, 598. In one embodiment, chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a Low Pin Count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures may be possible. For example, instead of the point-to-point architecture of FIG. 5, a system may implement a multi-drop bus or other such architecture.

Figure 6:
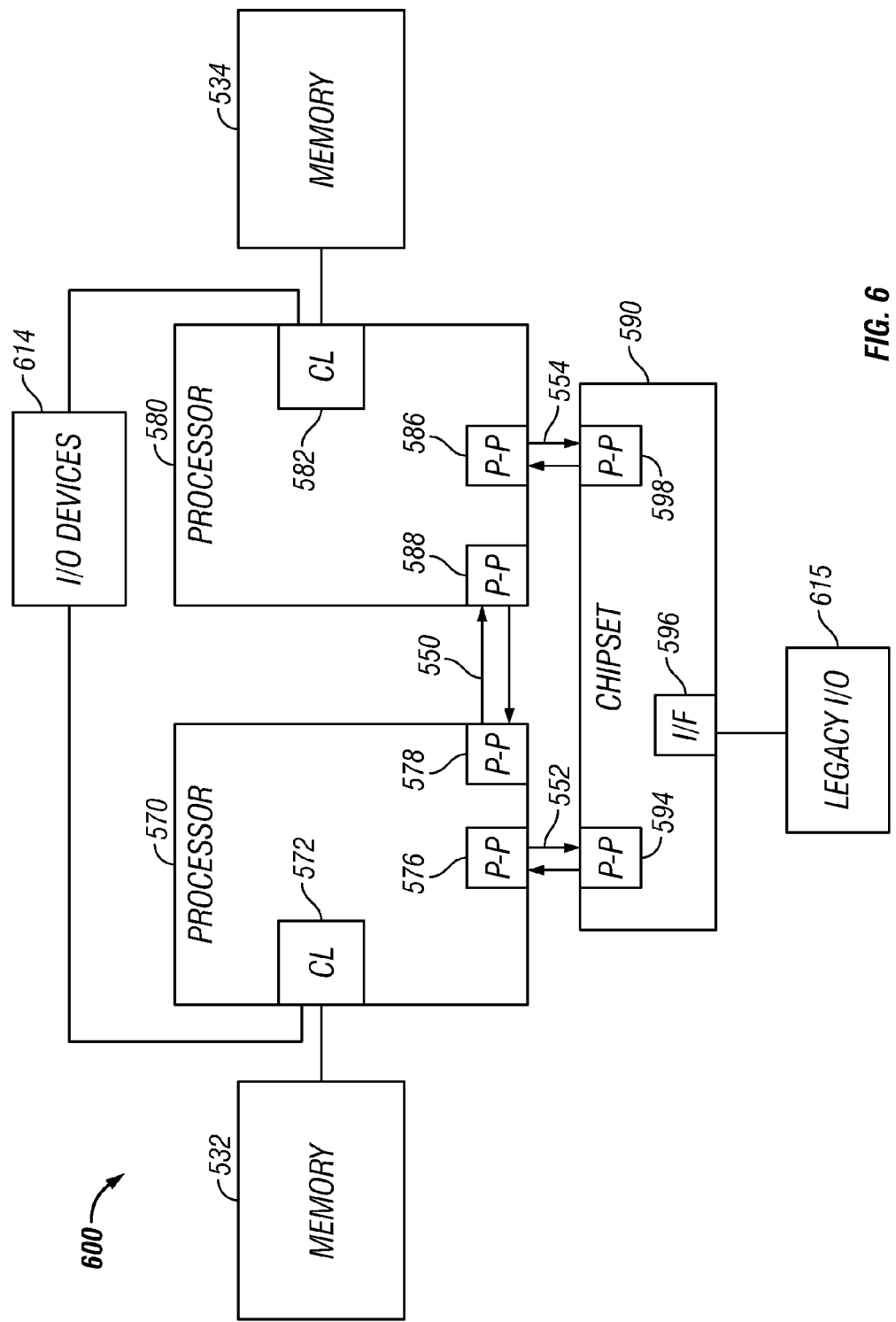
FIG. 6 is a block diagram of a third system in accordance with embodiments of the present disclosure.

FIG. 6 illustrates a block diagram of a third system 600 in accordance with embodiments of the present disclosure. Like elements in FIGS. 5 and 6 bear like reference numerals, and certain aspects of FIG. 5 have been omitted from FIG. 6 in order to avoid obscuring other aspects of FIG. 6.

FIG. 6 illustrates that processors 670, 680 may include integrated memory and I/O Control Logic ("CL") 672 and 682, respectively. For at least one embodiment, CL 672, 682 may include integrated memory controller units such as that described above in connection with FIGS. 3-5. In addition, CL 672, 682 may also include I/O control logic. FIG. 6 illustrates that not only memories 632, 634 may be coupled to CL 672, 682, but also that I/O devices 614 may also be coupled to control logic 672, 682. Legacy I/O devices 615 may be coupled to chipset 690.

Figure 7:
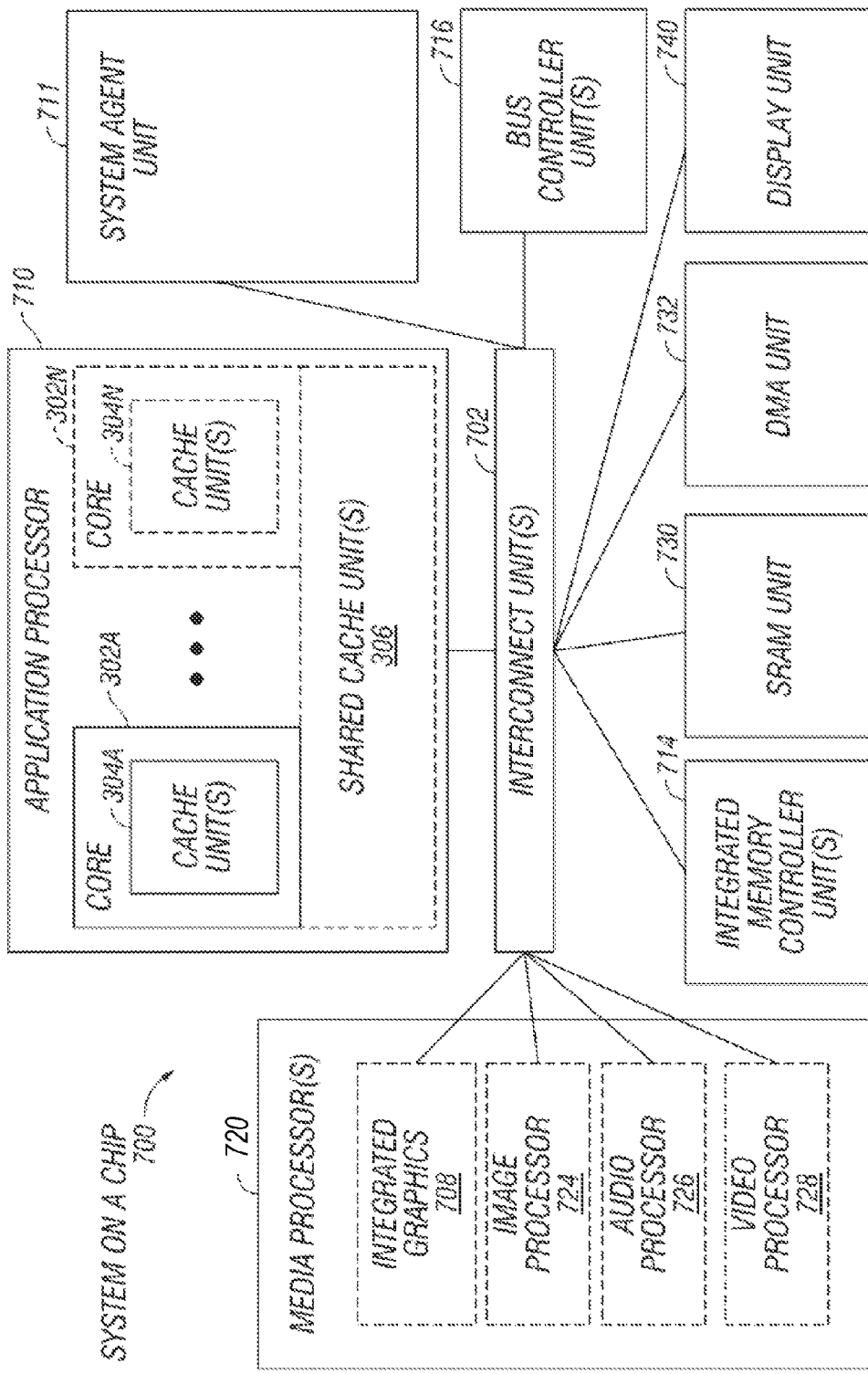
FIG. 7 is a block diagram of a system-on-a-chip, in accordance with embodiments of the present disclosure.

FIG. 7 illustrates a block diagram of a SoC 700, in accordance with embodiments of the present disclosure. Similar elements in FIGS. 3A-3B bear like reference numerals. Also, dashed lined boxes may represent optional features on more advanced SoCs. An interconnect units 702 may be coupled to: an application processor 710 which may include a set of one or more cores 302A-N and shared cache units 306; a system agent unit 711; a bus controller units 716; an integrated memory controller units 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; an SRAM unit 730; a DMA unit 732; and a display unit 740 for coupling to one or more external displays.

Figure 8:
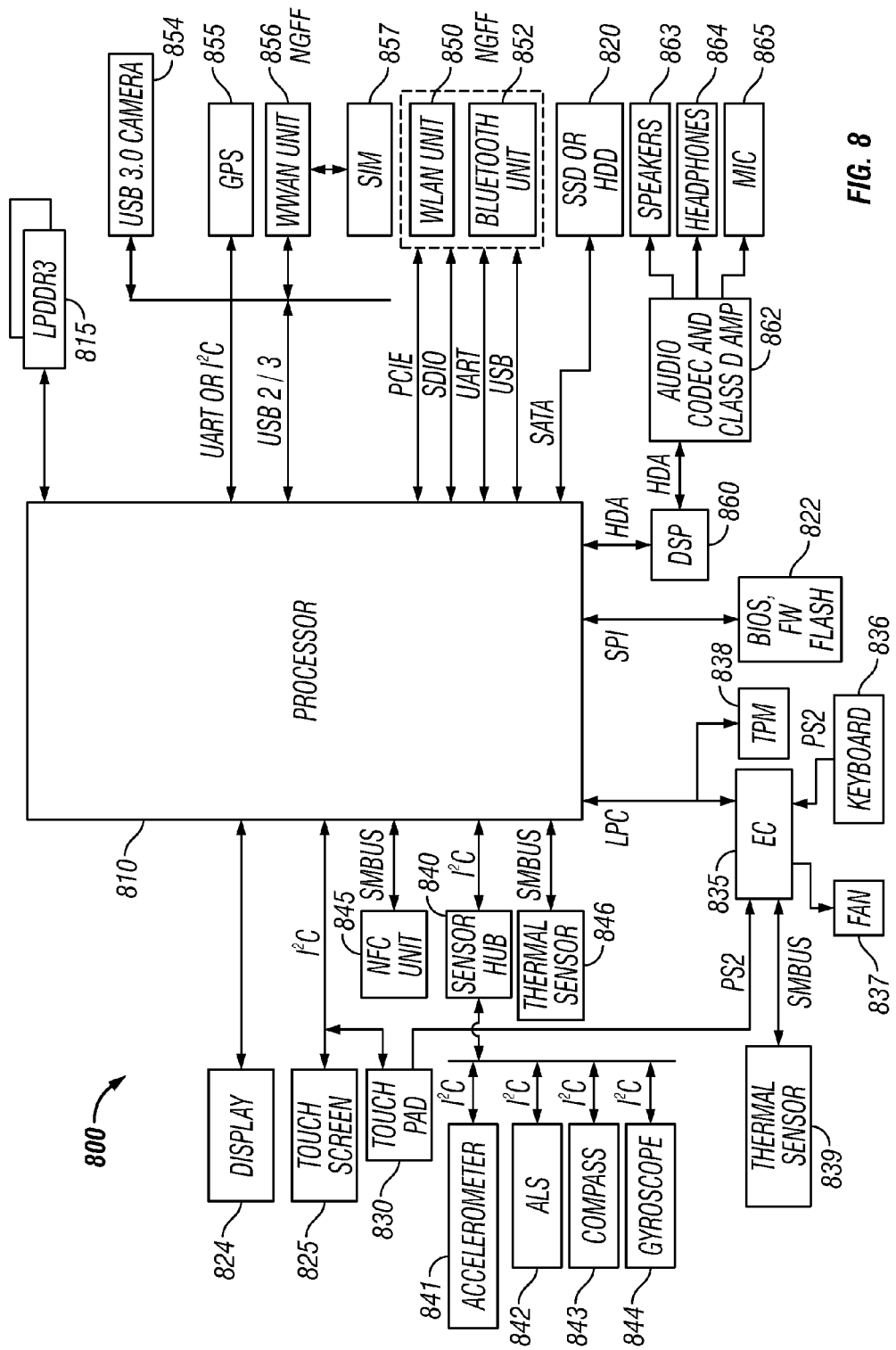
FIG. 8 is a block diagram of an electronic device for utilizing a processor, in accordance with embodiments of the present disclosure.

FIG. 8 is a block diagram of an electronic device 800 for utilizing a processor 810, in accordance with embodiments of the present disclosure. Electronic device 800 may include, for example, a notebook, an ultrabook, a computer, a tower server, a rack server, a blade server, a laptop, a desktop, a tablet, a mobile device, a phone, an embedded computer, or any other suitable electronic device.

Electronic device 800 may include processor 810 communicatively coupled to any suitable number or kind of components, peripherals, modules, or devices. Such coupling may be accomplished by any suitable kind of bus or interface, such as I²C bus, System Management Bus (SMBus), Low Pin Count (LPC) bus, SPI, High Definition Audio (HDA) bus, Serial Advance Technology Attachment (SATA) bus, USB bus (versions 1, 2, 3), or Universal Asynchronous Receiver/Transmitter (UART) bus.

Such components may include, for example, a display 824, a touch screen 825, a touch pad 830, a Near Field Communications (NFC) unit 845, a sensor hub 840, a thermal sensor 846, an Express Chipset (EC) 835, a Trusted Platform Module (TPM) 838, BIOS/firmware/flash memory 822, a DSP 860, a drive 820 such as a Solid State Disk (SSD) or a Hard Disk Drive (HDD), a wireless local area network (WLAN) unit 850, a Bluetooth unit 852, a Wireless Wide Area Network (WWAN) unit 856, a Global Positioning System (GPS) 855, a camera 854 such as a USB 3.0 camera, or a Low Power Double Data Rate (LPDDR) memory unit 815 implemented in, for example, the LPDDR3 standard. These components may each be implemented in any suitable manner.

Furthermore, in various embodiments other components may be communicatively coupled to processor 810 through the components discussed above. For example, an accelerometer 841, Ambient Light Sensor (ALS) 842, compass 843, and gyroscope 844 may be communicatively coupled to sensor hub 840. A thermal sensor 839, fan 837, keyboard 846, and touch pad 830 may be communicatively coupled to EC 835. Speaker 863, headphones 864, and a microphone 865 may be communicatively coupled to an audio unit 864, which may in turn be communicatively coupled to DSP 860. Audio unit 864 may include, for example, an audio codec and a class D amplifier. A SIM card 857 may be communicatively coupled to WWAN unit 856. Components such as WLAN unit 850 and Bluetooth unit 852, as well as WWAN unit 856 may be implemented in a Next Generation Form Factor (NGFF).

Figure 9:
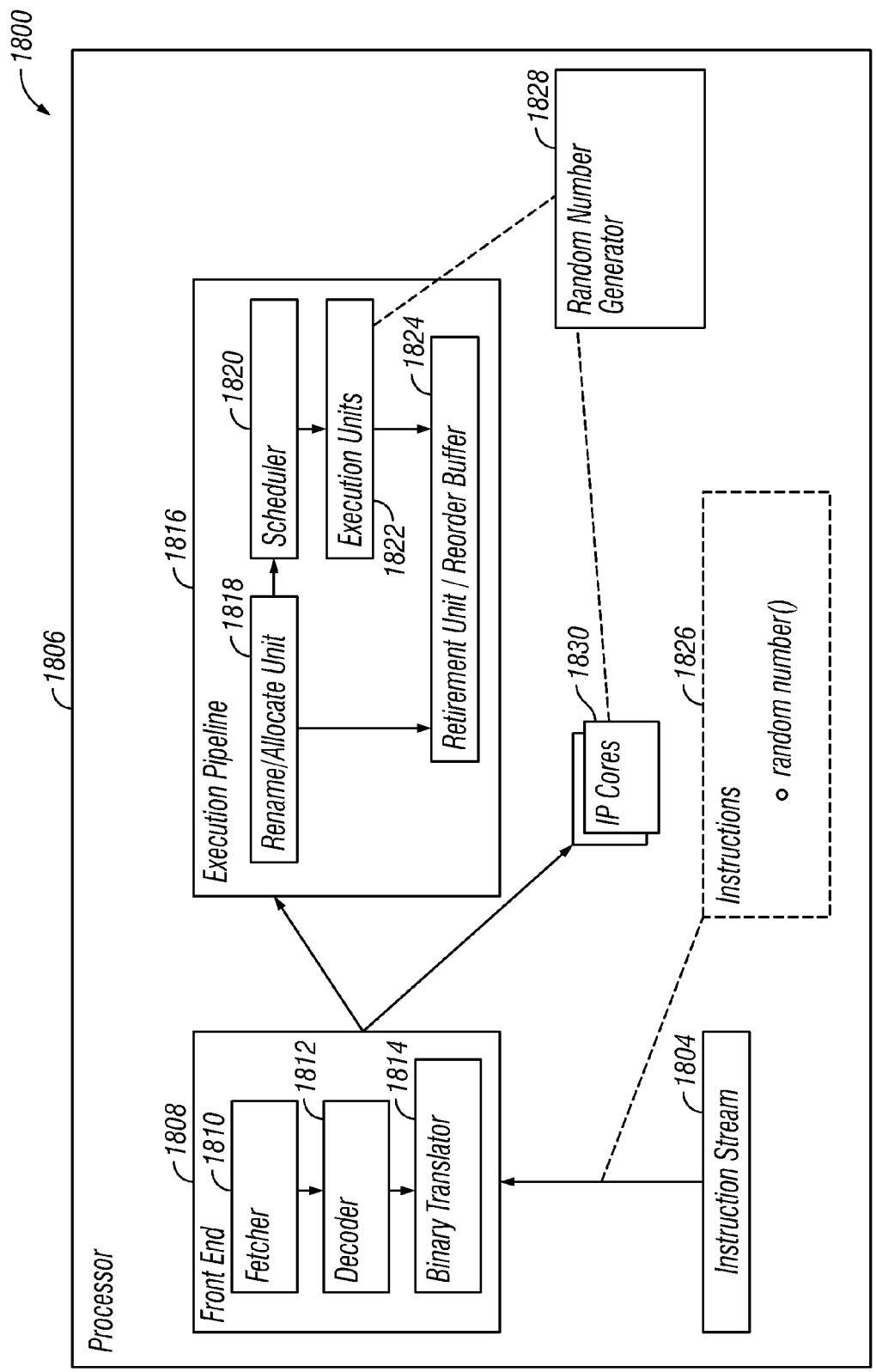
FIG. 9 is a block diagram of a system for random number generation, in accordance with embodiments of the present disclosure.

FIG. 9 is an illustration of an example embodiment of a system 1800 for random number generation, according to embodiments of the present disclosure. System 1800 may utilize random number generation in the process of performing any suitable task, such as creating or validating high-entropy keys for data encryption, secure wireless communications, or media content protection. System 1800 may utilize random number generation as part of executing instructions to fulfill these or other tasks. In one embodiment, system 1800 may include a random number generator (RNG) 1828. RNG 1828 may be implemented by, for example, circuits or a combination of circuits and logic blocks. In a further embodiment, RNG 1828 may be implemented fully within hardware. In another embodiment, RNG 1828 may include a full-entropy random number generator. In yet another embodiment, RNG 1828 may be a true random number generator. In still yet another embodiment, RNG 1828 may be a lightweight random number generator, suitable for use on a SoC.

In one embodiment, RNG 1828 may combine the entropy of one or more independent entropy sources to generate a random number. For example, RNG 1828 may combine three such sources. In a further embodiment, RNG 1828 may utilize one or more all-digital entropy sources to generate a random number. In another, further embodiment, RNG 1828 may utilize one or more self-calibrating entropy resources to generate a random number. In yet another, further embodiment, RNG 1828 may include extractor circuits to generate an output bitstream from its entropy sources. In still another, further embodiment, RNG 1828 may include a lightweight extractor. The lightweight extractor may include a Barack-Impagliazzo-Widgersen (BIW) extractor of an 8-bit size. The extractor might be accomplished in approximately 1.3K gates.

In one embodiment, RNG 1828 may be included in a processor, SoC, integrated circuit, or other mechanism. For example, system 1800 may include processor 1806. Although processor 1806 is shown and described as an example, any suitable mechanism may be used. Processor 1806 may include any suitable mechanisms for random number generation. Processor 1802 may be implemented fully or in part by the elements described in FIGS. 1-8. In another embodiment, RNG 1828 may be co-located with a processor on a die, but may be a stand-alone entity.

RNG 1828 may be included in any suitable portion of processor 1806. For example, RNG 1828 may be implemented as an execution unit 1822 within an in-order or out-of-order execution pipeline 1816. In another example, RNG 1828 may be implemented within an intellectual property (IP) core 1830 separate from main cores of processor 1806.

RNG 1828 may be invoked in any suitable manner. RNG 1828 may be implicitly or explicitly invoked by instructions 1826 executing on system 1800. RNG 1828 may be implicitly invoked by a core when, given a software instruction to produce a random number, the core may carry out the software instruction by accessing RNG 1828. RNG 1828 may be explicitly invoked by a core when an instruction, created by a compiler, interpreter, or other entity with knowledge of the specific configuration of processor 1806, identifies it to specifically handle generation of a random number. RNG 1828 may create a random number more efficiently than other execution units or IP cores that are to perform general arithmetic or mathematical operations.

Instructions may be received from instruction stream 1804, which may be residing within a memory subsystem of system 1800. Processor 1802 may include a front end 1806, which may receive and decode instructions from instruction stream 1804 using a decode pipeline stage. The decoded instructions may be dispatched, allocated, and scheduled for execution by an allocate unit 1818 and scheduler 1820 of a pipeline 1816 and allocated to specific execution units 1820. After execution, instructions may be retired by a writeback stage or retirement stage in retirement unit 1824. If processor 1802 is out-of-order, allocate unit 1818 may rename instructions and they may be input into a reorder buffer 1824 in association with the retirement unit. The instructions may be retired as-if they were executed in-order.

Although various operations are described in this disclosure as performed by specific components of processor 1806, the functionality may be performed by any suitable portion of processor 1806.

As discussed above, RNG 1828 may utilize one or more all-digital entropy sources. These sources may be used instead of a variety of sources using non-deterministic physical phenomena such as phase jitter, oxide soft-breakdown, and thermal noise. Raw bitstreams produced by thermal noise-based random number generators may display high levels of entropy and may meet industry standards. However, the present disclosure recognizes that these may still contain non-uniformities and serial-correlations due to 6σ random process variations, intermittent high-frequency supply/coupling noise, and feedback control loop artifacts. The present disclosure recognizes that these conditions may render such entropy sources sub-optimal in, for example, direct use as full-entropy cryptographic key generators in high-volume manufacturing environments. While some random number generators may overcome non-idealities in analog sources by using keyed functions to post-process the output of a single non-uniform entropy source, the present disclosure recognizes that these might require significant area on a die, such as more than 30,000 gates. Furthermore, they may require high amounts of energy. Accordingly, RNG 1828 may be preferable for use in ultra-low energy, internet-of-things (IoT), and wearable platform applications.

Figure 10:
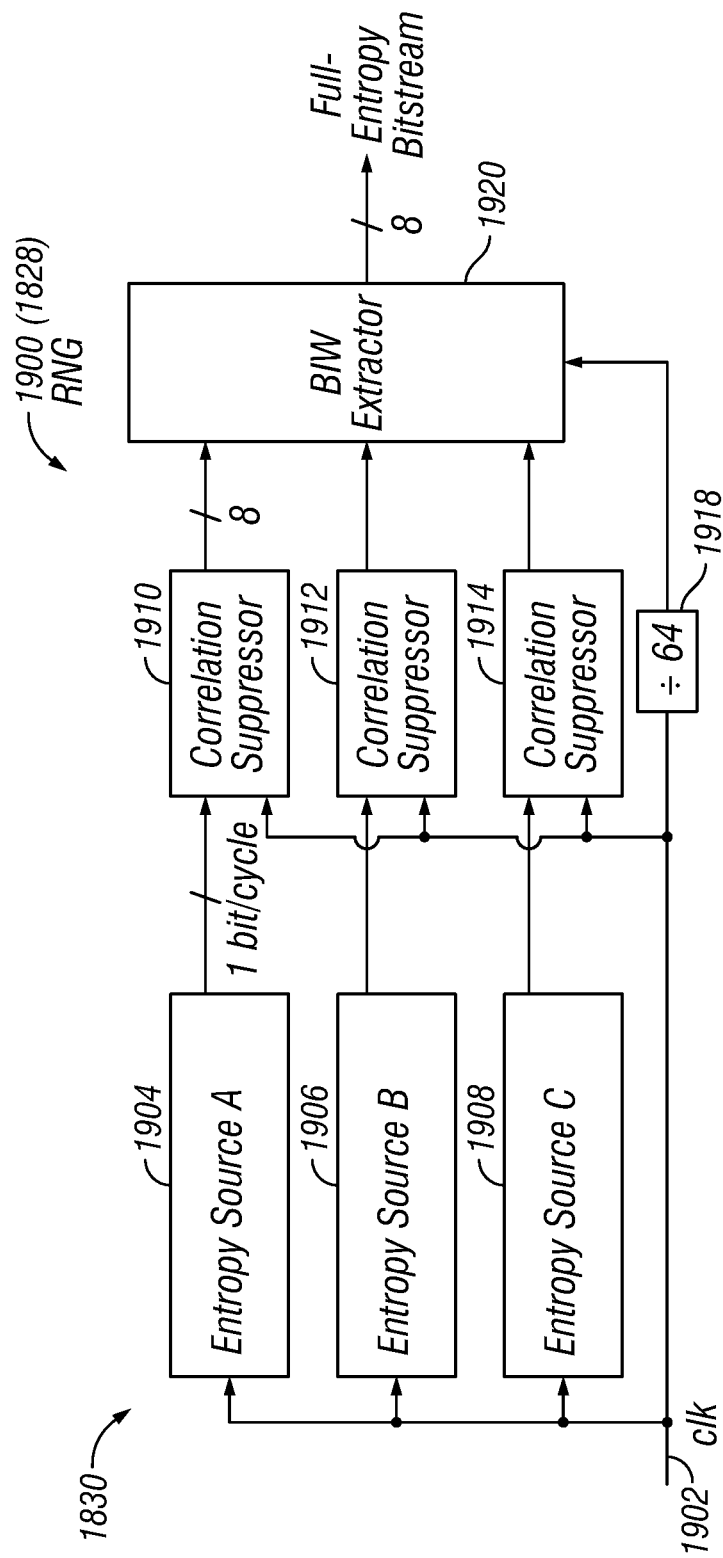
FIG. 10 is a block diagram of a random number generator circuit, in accordance with embodiments of the present disclosure.

FIG. 10 is a block diagram of an RNG circuit 1900, in accordance with embodiments of the present disclosure. RNG circuit 1900 may implement, fully or in part, RNG 1828.

RNG 1900 may include any suitable number of entropy sources. In one embodiment, RNG 1900 may include uniform entropy sources 1904, 1906, 1908. Each such entropy source may be implemented as an all-digital entropy source. Example embodiments of these entropy sources are discussed in more detail below.

In one embodiment, entropy sources 1904, 1906, 1908 may be placed in close proximity with each other. Entropy sources 1904, 1906, 1908 may share a common voltage supply and a common clock. In another embodiment, entropy sources 1904, 1906, 1908 may each produce a bit per clock cycle. The result may be three independent raw bitstreams.

In one embodiment, the individual streams may be fed into a corresponding correlation suppressor 1910, 1912, 1914. Example embodiments of these correlation suppressors are discussed in more detail below. In another embodiment, correlation suppressors 1910, 1912, 1914 may perform data whitening. Data whitening may include a decorrelation that transforms data having a covariance matrix into a new set of data whose covariance is the identity matrix, indicating that they are uncorrelated with a variance of one. In another, further embodiment, correlation suppressors 1910, 1912, 1914 may perform data whitening using undersampled feedback shift registers. Correlation suppressors 1910, 1912, 1914 may each generate an 8-bit uncorrelated string every 64 clock cycles. Correlation suppressors 1910, 1912, 1914 may use the same clock as the entropy sources.

In one embodiment, the 8-bit uncorrelated strings may be provided to an extractor 1920. In another embodiment, extractor 1920 may be a BIW extractor. Extractor 1820 may perform any suitable computation to extract a random set of values from the available 8-bit uncorrelated strings. In a further embodiment, extractor 1920 may perform a multiply-add operation using finite field arithmetic such as Galois Field (GF) techniques. For example, extractor 1920 may perform such an operation in GF($2^8$) with a 2-finite field with 256 elements. The extractor 1920 may further use an Advanced Encryption Standard (AES) reduction polynomial, such as $x^8+x^4+x^3+x+1$ to produce an 8-bit full-entropy output every 64 cycles. However, any suitable polynomial may be used. A clock divided 1918 may provide clock signal 1902 divided by 64. Embodiments of extractor 1920 are discussed in more detail below. The output of extractor 1920 may be a full-entropy bitstream of a width of eight bits.

Figure 11:
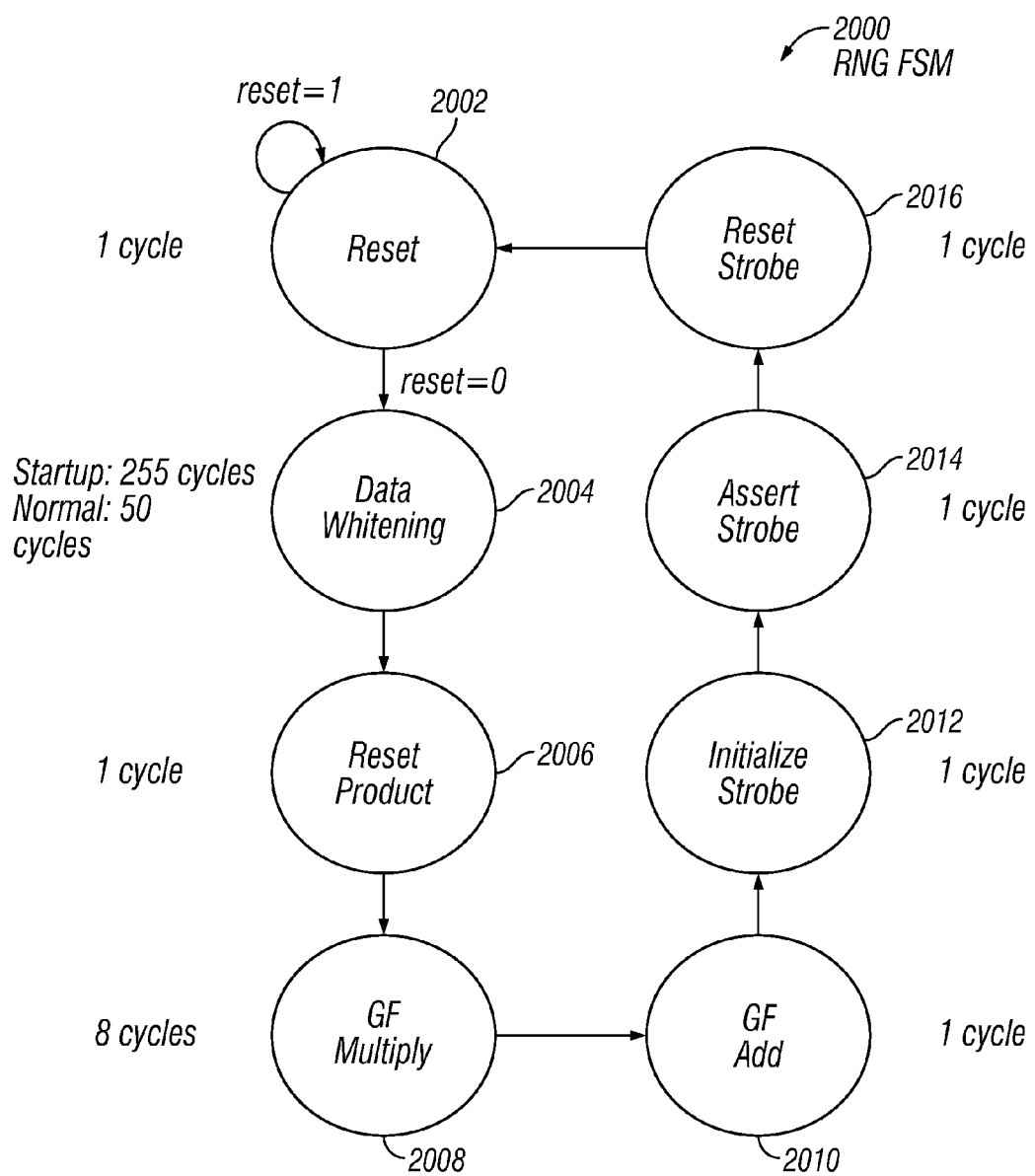
FIG. 11 is a block diagram of a state machine for a random number generator circuit, in accordance with embodiments of the present disclosure.

FIG. 11 is a block diagram of a state machine 2000 for a random number generator circuit, in accordance with embodiments of the present disclosure. State machine 2000 may illustrate example operation of RNG 1900.

In state 2002, a reset state may be entered upon initialization, startup, or upon assertion of a reset pin or command to the RNG. If reset is held high, state machine 2000 may remain in state 2002. Upon release of reset, state machine 2000 may move to state 2004.

In state 2004, data may be whitened. The performance of state 2004 may depend upon whether enough random bits have already been created so as to build a sufficient number to eliminate transient values. For example, upon startup of the RNG, state 2004 may execute for 255 cycles. This may be sufficient to allow startup transients to settle. In other cases, state 2004 may execute for 50 cycles. Entropy sources may be generating random bitstream values during state 2004 and data correlators may be amending such bitstreams.

In state 2006, state 2008 and state 2010, an extractor may randomize an output from the data output by the data correlators. For example, in state 2006 contents of product-calculating circuitry may be flushed or reset. This may take a cycle to perform. In state 2008, eight bits from a first entropy source and eight bits from a second entropy source may be multiplied in bit-serial fashion. This may require eight cycles. In state 2010, this product may be added to eight bits from a third entropy source. This may require a single cycle.

In state 2012, a strobe may be initialized, and in state 2014 the strobe may be asserted, and in state 2016 the state may be reset. Assertion of the strobe may cause or signal output from the extractor to be delivered. This output may include a randomized bitstream output. State machine 2000 may return to state 2002. Data whitening may continue in parallel to the multiplication, addition, and strobe states. The total latency of state machine 2000 may be 64 cycles.

Figure 12:
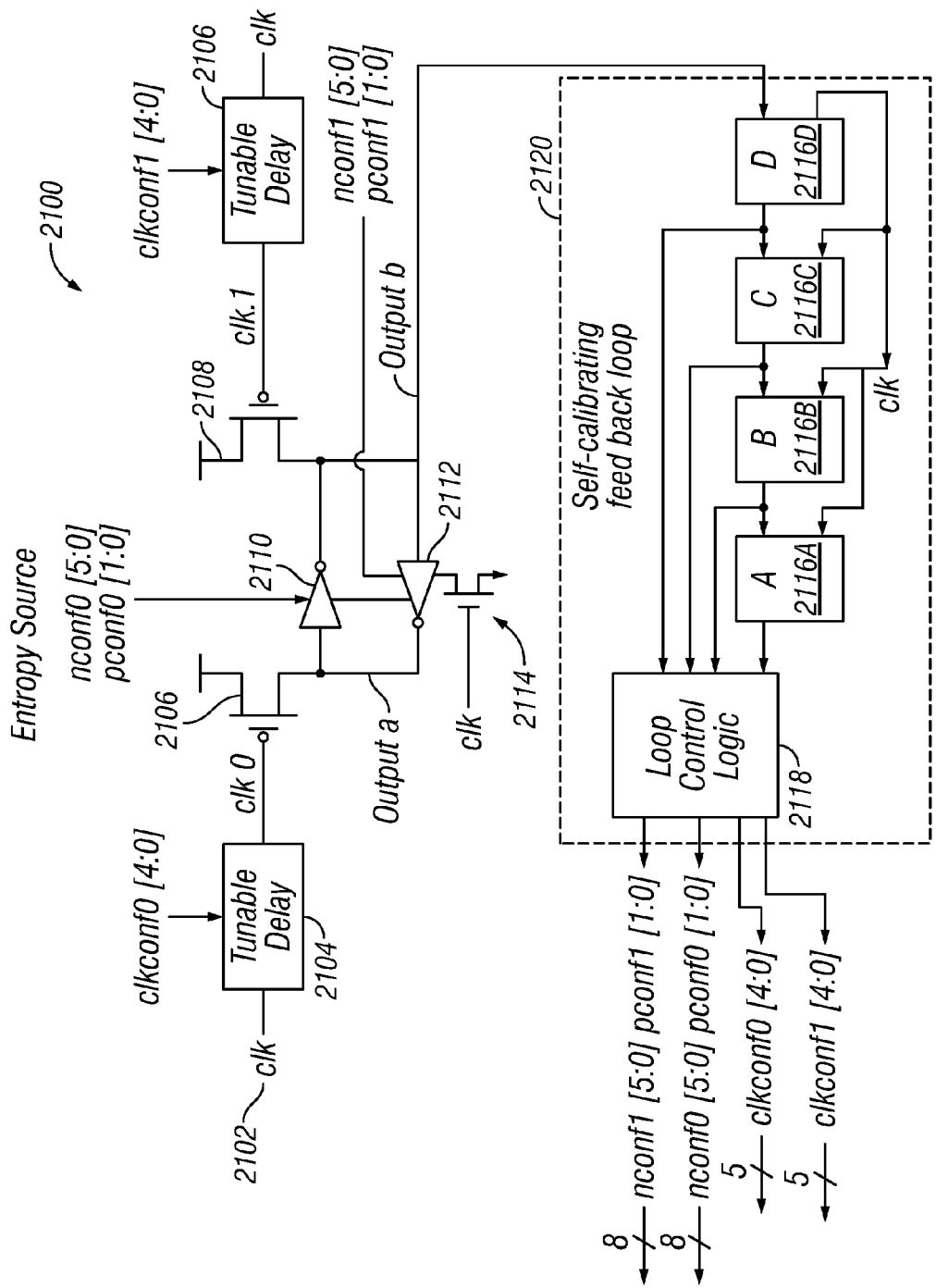
FIG. 12 is a block diagram of an all-digital random number generator entropy source, in accordance with embodiments of the present disclosure.

FIG. 12 is a block diagram of an all-digital random number generator entropy source 2100, in accordance with embodiments of the present disclosure. Source 2100 may implement, fully or in-part, one or more of sources 1904, 1906, 1908.

In one embodiment, source 2100 may be implemented as an all-digital source. In another embodiment, source 2100 may harvest differential thermal-noise at the diffusion nodes of a cross-coupled inverter pair. The inverter-pair may include inverters 2110, 2112. In a further embodiment, inverters 2110, 2112 may be implemented as configurable inverters. Embodiments of inverters 2110, 2112 are described in further detail below. The inverter-pair may be pre-charged. By harvesting differential thermal-noise at the diffusion nodes, source 2100 may resolve out of metastability. The outputs may be made from "a" or from "b" denoted in the figure. A random bit per cycle may be generated.

However, process-voltage-temperature variations, aging-induced mismatches, or coupled noise might disrupt this ideal behavior by introducing biases that favor resolution towards a state (zero or one). In one embodiment, source 2100 may include tuning of inverters 2110, 2112 to overcome biases. For example, inverters 2110 may be implemented with multiple NMOS and PMOS transistors. In a further embodiment, source 2100 may apply configuration bits to inverters 2110, 2112, which may use the configuration bits to skew transistor legs therein to modulate relative strengths of transistors, thus affecting output. For example, bits for adjusting NMOS transistor legs may be denoted as "nconf" and bits for adjusting PMOS transistor legs may be denoted as "pconf". The number of bits may depend upon the particular implementation in inverters 2110, 2112. For example five bits may be used for nconf and two bits may be used for pconf. An nconf and pconf may be available individually for each of inverters 2110, 2112. The bits may specify whether given parallel NMOS or PMOS legs are to be turned on or off. The result may be a modulation of transistor strengths, tending to skew output to be a zero or to be a one. The tuning of inverters 2110, 2112 may be coarse compared to tuning of other elements, such as tunable delays 2104, 2106.

In another embodiment, source 2100 may include adjusting tunable delays 2104, 2106 to overcome biases. The tuning of tunable delays 2104, 2106 may be more fine-grained when compared to the tuning of inverters 2110, 2112. In a further embodiment, adjustments of tunable delays 2104, 2106 may include tuning using programmable clock delays to skew the clock signals of pre-charge release times. For example, a node 2106 that displays bias towards a '0' is held in pre-charge for a relatively longer time than its complementary node 2108. Embodiments of tunable delays are described in greater detail below. The inputs to tunable delays 2104, 2106 may be denoted as "clkconf". While any suitable number of bits may be used, a given clkconf adjustment dataset may include, for example, five bits. A clkconf dataset may be provided independently to each of tunable delays 2104, 2106.

In another embodiment, source 2100 may include a self-calibrating feedback loop 2120 to overcome biases. Loop 2120 may be controlled by loop control logic 2118. Logic 2118 may include a finite-state machine that continuously tracks a record of outputs from the inverter-pair. For example, the past four outputs may be tracked by a shift register or flip-flops 2116A-2116D. Logic 2118 may keep entropy source 2100 biased in high-entropy results. Loop 2120 may respond to changes in operating conditions by updating the configuration bits in real-time and recirculating the bits to inverters 2110, 2112 and tunable delays 2104, 2106.

At startup, entropy source 2100 may self-calibrate by updating one of the coarse-grained nconf counters until a 1-0 or 0-1 transition is obtained. This six-bit coarse-grain tuning step may compensate for up to 40 mV device Vt mismatch with 1 mV resolution. After the first transition, control transfers from NMOS tuning to PMOS tuning and pconf counters may be similarly updated until a reverse transition occurs. At this stage, large device offsets may have been tuned out and entropy source 2100 may enter fine-grained tuning steps. Loop 2120 may monitor output bits and update clkconf counters each cycle to increase the entropy source's sensitivity to thermal noise. The response may have a fine-grained resolution of 0.1 mV. By providing an all-digital approach, entropy source 2100 may be a robust source that responds in one clock cycle to PVT events, generating a random bitstream with high throughput and excellent energy efficiency.

Figure 13:
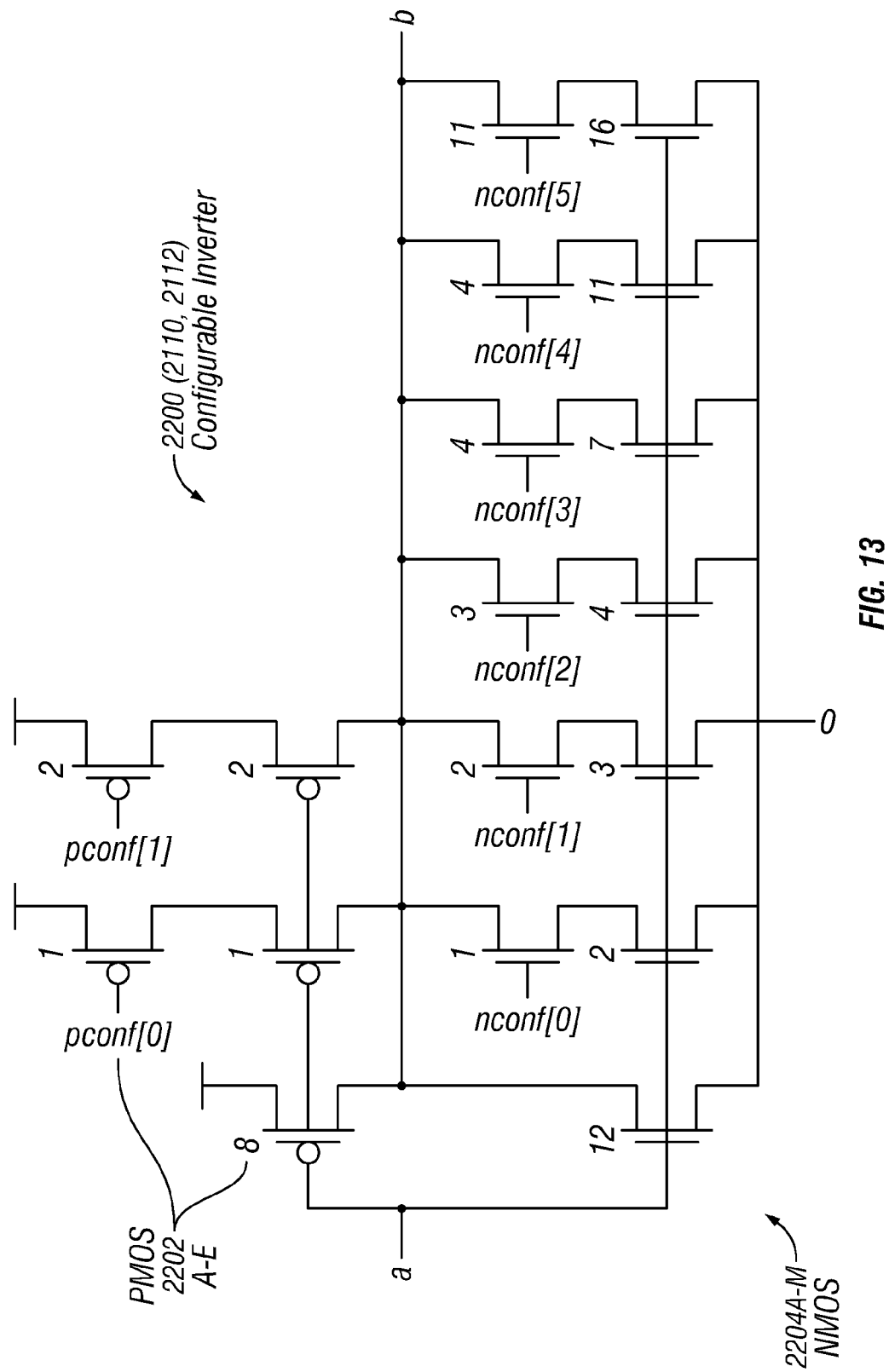
FIG. 13 is a block diagram of a configurable inverter, in accordance with embodiments of the present disclosure.

FIG. 13 is a block diagram of a configurable inverter 2200, in accordance with embodiments of the present disclosure. Inverter 2200 may implement, fully or in-part, inverters 2110, 2112.

Inverter 2200 may include a suitable number of PMOS 2202 and NMOS 2204 transistors. In one embodiment, PMOS 2202 and NMOS 2204 may include the arrangement shown in the figure. However, any suitable number and kind of transistors may be used to implement inverter 2200. Two higher-level PMOS 2202 transistors may be coupled with pconf bits as input. Similarly, five high-level NMOS 2204 transistors may be coupled with nconf bits as input, wherein each is attached to another NMOS 2204 transistor. The lower NMOS 2204 transistors of the pair may be connected to the higher NMOS 2204 transistors via the former's source and the latter's drain. Similarly, the source of lower-level PMOS 2202 transistors may be coupled to the drain of higher-level PMOS 2202 transistors. The output of inverter 2200 may be "a" or "b". Turning on nconf or pconf will activate corresponding transistor legs.

Figure 14:
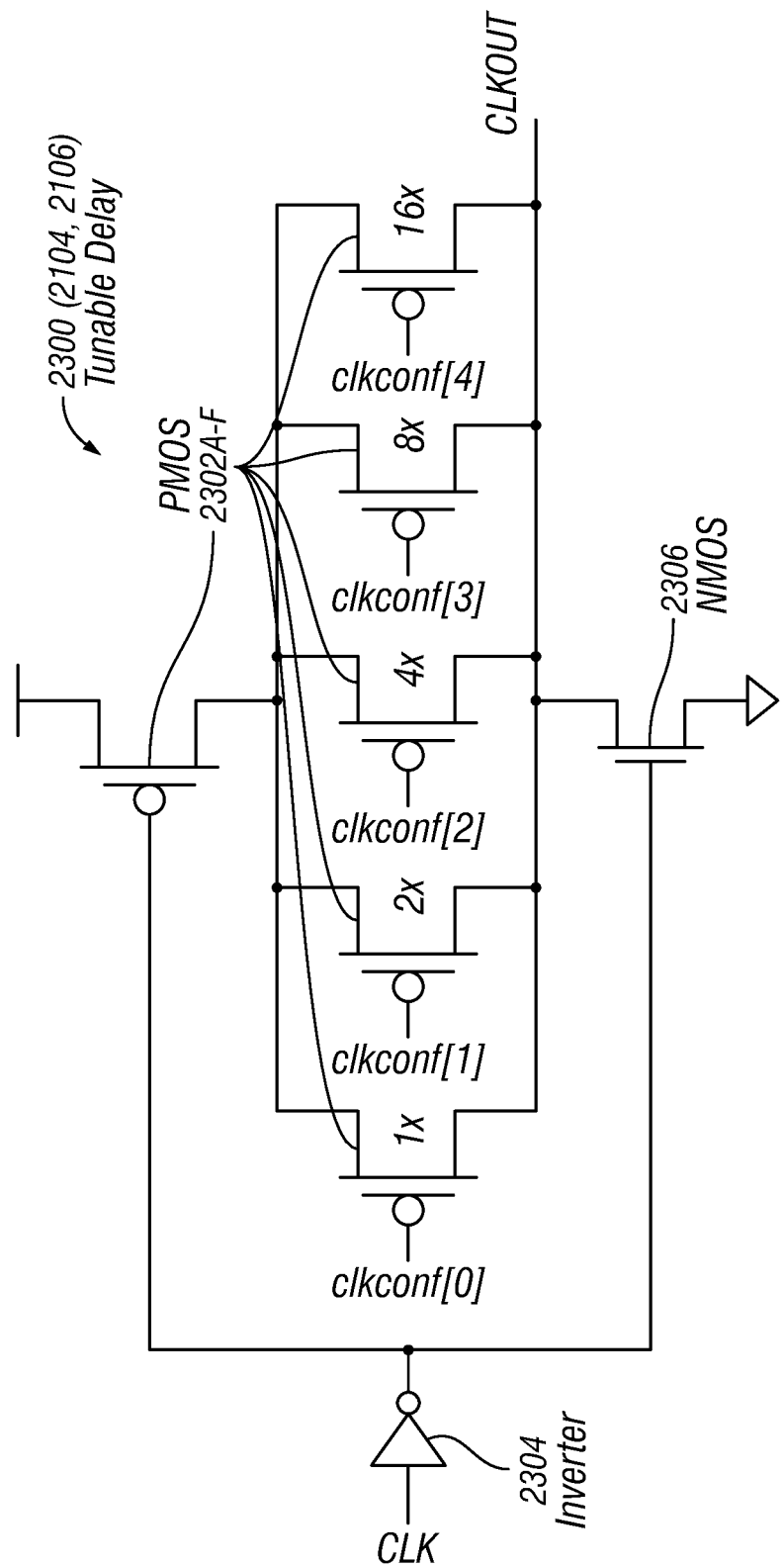
FIG. 14 is a block diagram of a tunable delay, in accordance with embodiments of the present disclosure.

FIG. 14 is a block diagram of a tunable delay 2300, in accordance with embodiments of the present disclosure. Delay 2300 may implement, fully or in-part, delays 2104, 2106. A series of PMOS 2302 transistors may be cascaded so as to provide 1, 2, 4, and 8, and 16× outputs. Each may be coupled to a bit of clkconf input. The clock input may be coupled to an inverter 2304, which may go to the gate of the first PMOS 2302 transistor. An NMOS 2306 transistor may be coupled to the drain of the cascaded PMOS 2302 transistors. Another PMOS 2302 transistor may be coupled to the source of the cascaded PMOS 2302 transistors. Although a particular implementation and arrangement of transistors is shown, any suitable arrangement of components may be used to create a configurable delay that may be skewed faster or slower depending upon the inputs provided thereto.

Figure 15:
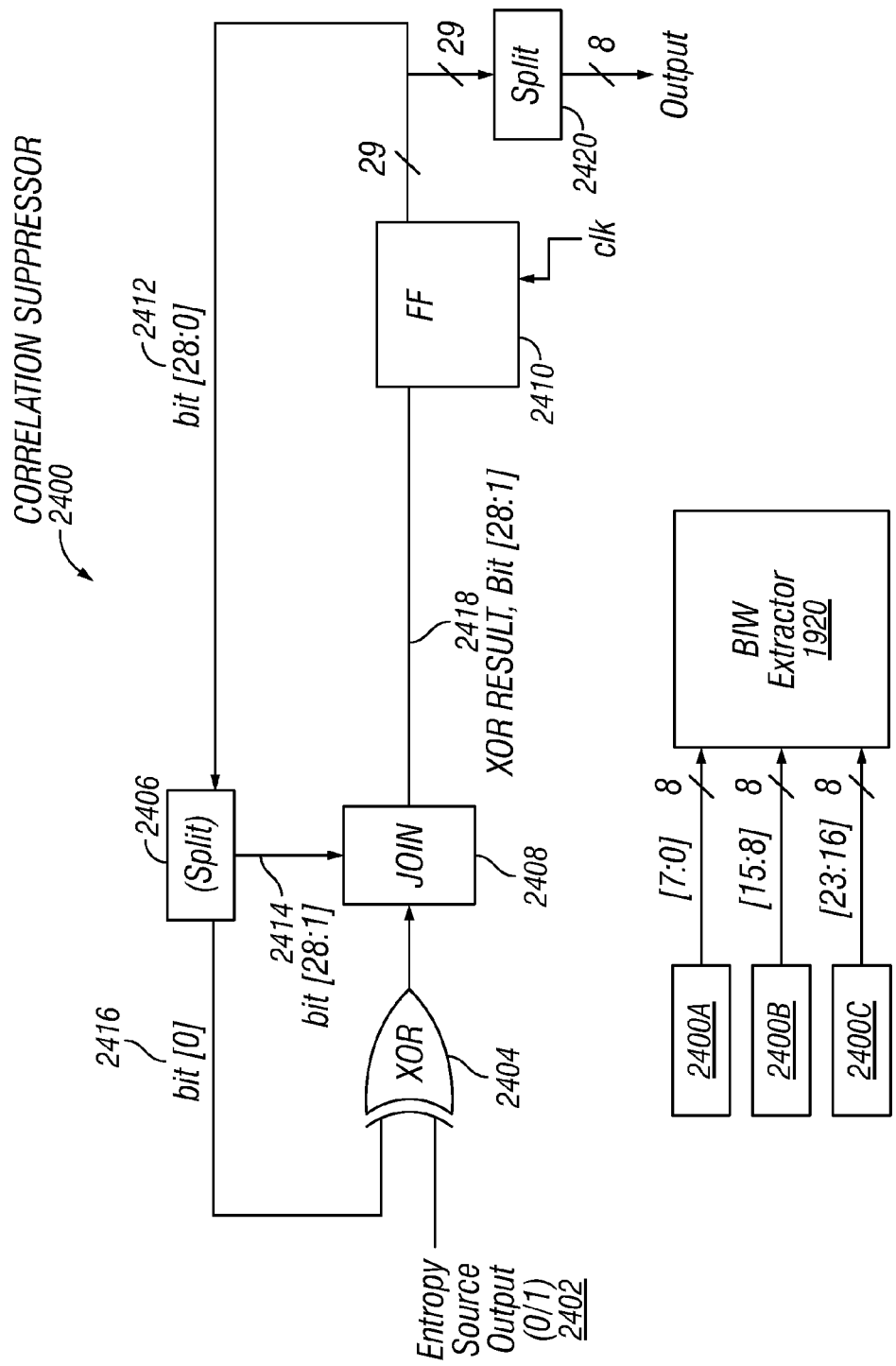
FIG. 15 is a block diagram of a correlation suppressor, in accordance with embodiments of the present disclosure.

FIG. 15 is a block diagram of a correlation suppressor 2400, in accordance with embodiments of the present disclosure. Correlation suppressor 2400 may implement, fully or in part, correlation suppressors 1910, 1912, 1914.

Correlation suppressor 2400 may be implemented in any manner to remove correlations in received input from entropy sources. Correlation suppressor 2400 may gather a total of 29 bits, though more or less may be used. In one embodiment, as an entropy source output 2402 is received from an entropy source, the input data, such as a bit, may be added to those already collected by correlation suppressor 2400. In a further embodiment, the received bit may be further randomized. For example, the received bit may be compared against a bit 2416 in the array already stored by correlation suppressor 2400. The bit may be, for example, the oldest bit in the array. The comparison may be made, in an embodiment, with an XOR gate 2404. The result of the XOR operation may be joined at 2408 with the remainder of the array already stored, less the bit that was compared. The bit that was compared may have been split at 2406 from the remainder of the array. The result 2418 of the joined data may be passed to a shift register or flip-flop 2410, which may advance the shift register every clock cycle. The output of the shift register may be passed back to be split again at 2406 in a next iteration.

Correlation suppressor 2400 may constitute a conditioning circuit that transforms non-uniform randomness of raw bitstreams to a cryptographically useful uniform distribution. Cryptographic algorithms like hash-based HMAC or cipher-based AES-CBC-MAC have a proven ability to extract n bits of full-entropy from an input word containing at least 2n bits of min-entropy. However, their large area and energy consumption make them unsuitable for ultra-light-weight platforms such as a Soc. In contrast, a BIW extractor of system 1800 may use GF arithmetic to extract entropy from three mutually independent sources, as discussed above. Statistical independence of the entropy sources may be furthered by correlation suppressor 2400.

In one embodiment, correlation suppressor 2400 may be an undersampled 29-deep XOR feedback shift-register. The relative primality of shift-register length (29) versus the sampling rate of 64 cycles may cause influence of the input bitstreams to specific output bits to change, or rotate in consecutive samplings. In a further embodiment, no overlapping bits may be sampled from instances of correlation suppressor 2400. For example, eight bits may be taken from three different instances of correlation suppressor. The eight bits might come from different, non-overlapping ranges from the three decorrelators 2400A ([7:0]), 2400B ([15:8]), and 2400C ([23:16]). In yet another, further embodiment, these may be sent to BIW extractor 1920.

Figure 16:
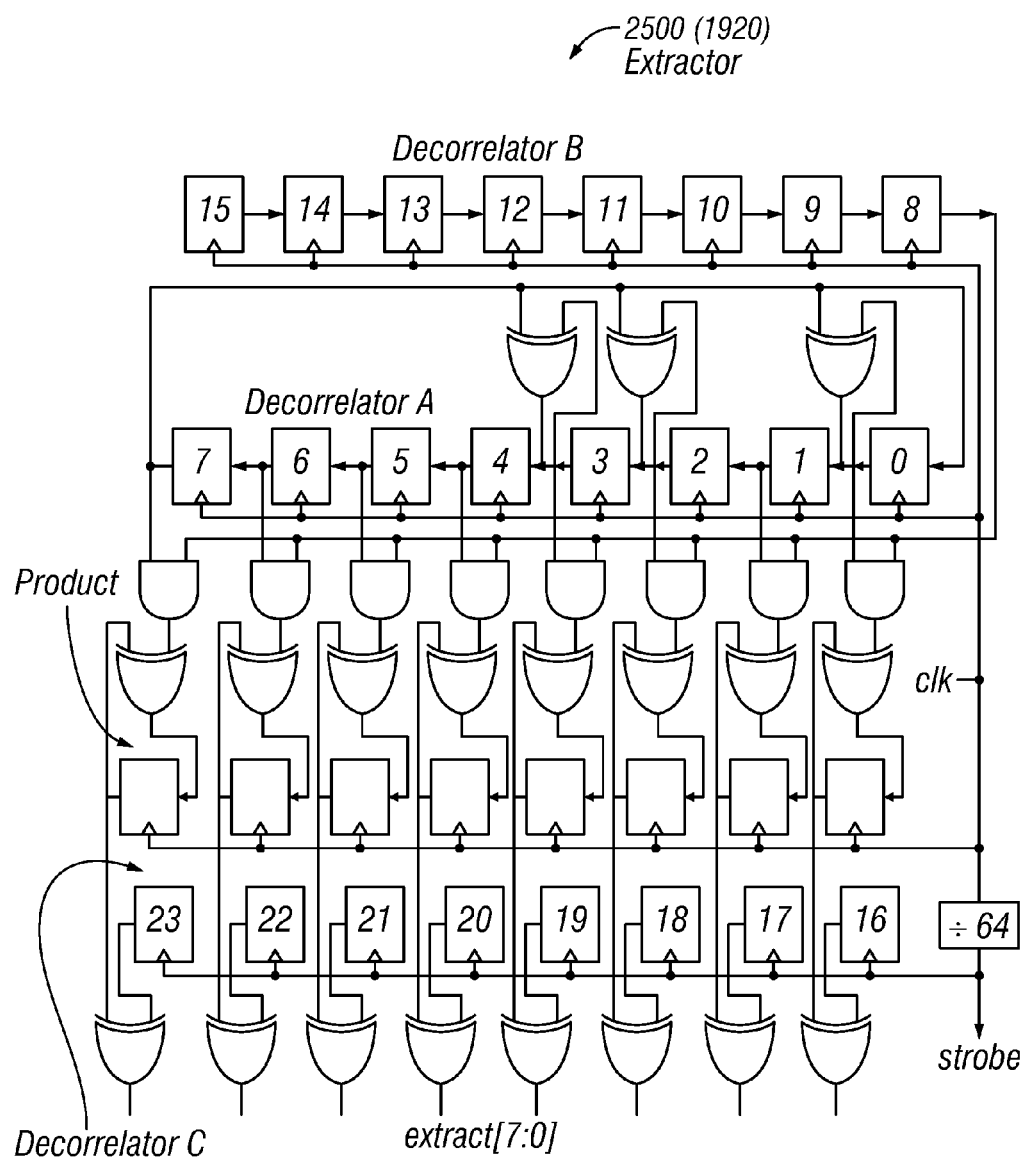
FIG. 16 is a block diagram of an extractor, in accordance with embodiments of the present disclosure.

FIG. 16 is a block diagram of an extractor 2500, in accordance with embodiments of the present disclosure. Extractor 1920 may implement, fully or in-part, extractor 2500. Extractor 2500 may be implemented in any suitable manner, including more or fewer elements than those shown. Extractor 2500 may include a BIW extractor.

In one embodiment, extractor 2500 may include digital logic gates and shift registers to perform GF multiplication. For example, extractor 2500 may include inputs from the decorrelators 2400A, 2400B, and 2400C. These may be stored in shift registers. In a first stage, extractor 2500 may apply a $GF(2^8)$ multiplication operation to serially-multiply the bits chosen from 2400A and 2400B and add the bits chosen from 2400C. In a second stage, extractor 2500 may apply a reduction with the AES polynomial $x^8+x^4+x^3+x+1$. A strobe may be issued every 64 clock cycles to indicate that the 8-bit full-entropy output is available at extract[7:0].

Figure 17:
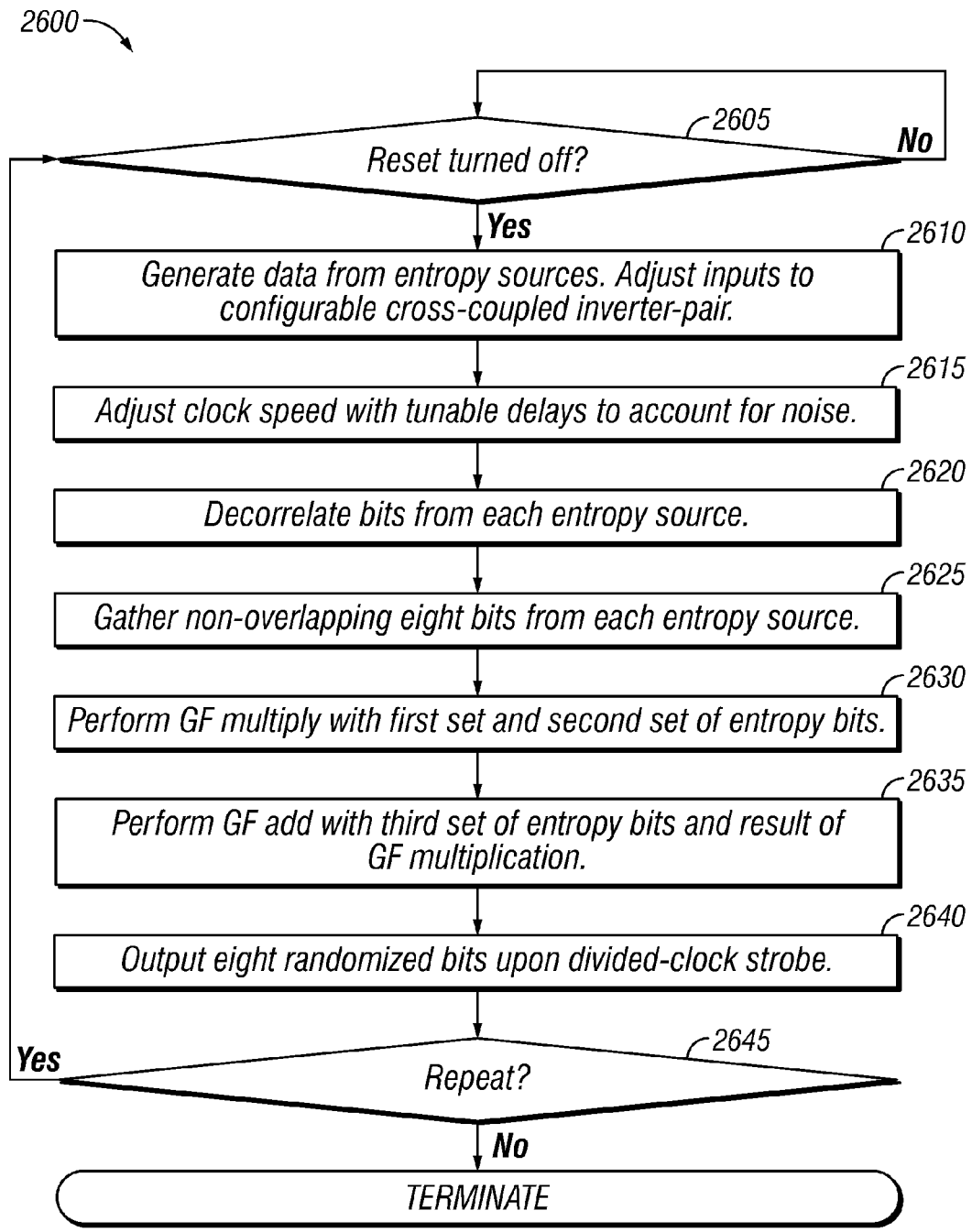
FIG. 17 is a block diagram of a method for random number generation, in accordance with embodiments of the present disclosure.

FIG. 17 is a block diagram of a method 2600 for random number generation, in accordance with embodiments of the present disclosure. Method 2600 may be implemented by any of the elements shown in FIGS. 1-16. Method 2600 may be initiated by any suitable criteria and may initiate operation at any suitable point. In one embodiment, method 2600 may initiate operation at 2605. Method 2600 may include greater or fewer steps than those illustrated. Moreover, method 2600 may execute its steps in an order different than those illustrated below. Method 2600 may terminate at any suitable step. Moreover, method 2600 may repeat operation at any suitable step. Portions of method 2600 may be performed in parallel and repeat with respect to other portions of method 2600.

At 2605, it may be determined whether a reset of an RNG has been turned off after being asserted. If so, method 2600 may proceed to 2610. Else, method 2600 may repeat at 2605.

At 2610, in one embodiment a bit may be generated from a plurality of uniform entropy sources. In a further embodiment, at each entropy source, inputs to the inverters may be adjusted so that outputs begin and remain random. The inputs may affect relative strengths of transistor legs within the inverters so as to bias the inverter. At 2615, in another embodiment, clock inputs to the inverters may be adjusted with tunable delays. These may be adjusted to, for example, account for noise and keep the output random. The inverters may be a cross-coupled pair with independent clocks. A bit may be issued from each inverter per clock cycle.

At 2620, in one embodiment bits may be gathered from each entropy source and decorrelated. At 2625, in another embodiment non-overlapping bits may be gathered from each entropy source as they are decorrelated. For example, eight bits from non-overlapping ranges may be chosen. The number of bits chosen may be less than the number of bits available for a given entropy source after decorrelation.

At 2630, in one embodiment bits may be extracted from each entropy source and passed to an extractor, which may select an eight output bits from the combination of all of the entropy sources. For example, a GF multiply with a first and second set of bits may be performed. At 2635, a GF add may be performed with a third set of bits and the result of the multiplication. This may have the effect of a reduction by an AES polynomial.

At 2640, upon a divided-clock strobe, randomized bits may be available as output from the RNG.

At 2645, method 2600 may optionally repeat or terminate.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

In some embodiments of the present inventions, a processor may include a front end to decode an instruction, an execution unit, and an allocator or other mechanism to assign the instruction to the execution unit to execute the instruction. The instruction may be to generate a random number. In combination with any of the above embodiments, in an embodiment the execution unit may include one or more entropy source circuits. In combination with any of the above embodiments, in an embodiment the entropy source circuits may include all-digital components to generate an initial randomized bit stream. In combination with any of the above embodiments, in an embodiment the execution unit may include one or more correlation circuits to remove correlations from the initial randomized bit stream to yield an intermediate randomized bit stream. In combination with any of the above embodiments, in an embodiment the processor may include an extractor circuit to select a subset of the intermediate randomized bit stream as a random output of the execution unit. In combination with any of the above embodiments, in an embodiment the random output is to fulfill part of the instruction execution. In combination with any of the above embodiments, in an embodiment an entropy source may include a tunable delay circuit. In combination with any of the above embodiments, in an embodiment the tunable delay circuit is to adjust randomness output of the entropy source. In combination with any of the above embodiments, in an embodiment the entropy source may include a cross-coupled inverter pair to generate random output. In combination with any of the above embodiments, in an embodiment the correlation circuits are to combine an element from the initial randomized bit stream with previous bits received from the entropy source circuit. In combination with any of the above embodiments, in an embodiment the correlation circuits are to randomize the element with respect to a corresponding element from the previous bits to remove correlation. In combination with any of the above embodiments, in an embodiment the extractor circuit is further to select bits from bit ranges of the correlation circuit that do not overlap with each other in order to select the subset of the intermediate randomized bit stream. In combination with any of the above embodiments, in an embodiment the extractor circuit is further to apply a reduction with a polynomial to the intermediate randomized bit stream to yield the random output. In combination with any of the above embodiments, in an embodiment the extractor circuit is further to apply a Galois Field multiplication and addition operations to the intermediate randomized bit stream to yield the random output. In combination with any of the above embodiments, in an embodiment the extractor circuit includes a BIW extractor.

In some of the present embodiments, a method may include, with entropy source circuits including all-digital components, generating an initial randomized bit stream. In combination with any of the above embodiments, in an embodiment the method may include removing correlations with one or more correlation circuits from the initial randomized bit stream to yield an intermediate randomized bit stream. In combination with any of the above embodiments, in an embodiment the method may include, with an extractor circuit, selecting a subset of the intermediate randomized bit stream as a random output of the execution unit. In combination with any of the above embodiments, in an embodiment the method may include adjusting randomness output of the entropy source with a tunable delay circuit. In combination with any of the above embodiments, in an embodiment the method may include generating random output from the entropy source through routing outputs of each of a cross-coupled inverter pair to the respective inputs of each other. In combination with any of the above embodiments, in an embodiment the method may include, with the correlation circuits, combining an element from the initial randomized bit stream with previous bits received from the entropy source circuit. In combination with any of the above embodiments, in an embodiment the method may include, with the correlation circuits, randomizing the element with respect to a corresponding element from the previous bits to remove correlation. In combination with any of the above embodiments, in an embodiment the method may include, with the extraction circuit, selecting bits from bit ranges of the correlation circuit that do not overlap with each other in order to select the subset of the intermediate randomized bit stream. In combination with any of the above embodiments, in an embodiment the method may include with the extraction circuit, applying a Galois Field multiplication and addition operations to the intermediate randomized bit stream to yield the random output.

In some embodiments of the present inventions, a system may include a front end to decode an instruction, an execution unit, and an allocator or other mechanism to assign the instruction to the execution unit to execute the instruction. The instruction may be to generate a random number. In combination with any of the above embodiments, in an embodiment the execution unit may include one or more entropy source circuits. In combination with any of the above embodiments, in an embodiment the entropy source circuits may include all-digital components to generate an initial randomized bit stream. In combination with any of the above embodiments, in an embodiment the execution unit may include one or more correlation circuits to remove correlations from the initial randomized bit stream to yield an intermediate randomized bit stream. In combination with any of the above embodiments, in an embodiment the system may include an extractor circuit to select a subset of the intermediate randomized bit stream as a random output of the execution unit. In combination with any of the above embodiments, in an embodiment the random output is to fulfill part of the instruction execution. In combination with any of the above embodiments, in an embodiment an entropy source may include a tunable delay circuit. In combination with any of the above embodiments, in an embodiment the tunable delay circuit is to adjust randomness output of the entropy source. In combination with any of the above embodiments, in an embodiment the entropy source may include a cross-coupled inverter pair to generate random output. In combination with any of the above embodiments, in an embodiment the correlation circuits are to combine an element from the initial randomized bit stream with previous bits received from the entropy source circuit. In combination with any of the above embodiments, in an embodiment the correlation circuits are to randomize the element with respect to a corresponding element from the previous bits to remove correlation. In combination with any of the above embodiments, in an embodiment the extractor circuit is further to select bits from bit ranges of the correlation circuit that do not overlap with each other in order to select the subset of the intermediate randomized bit stream. In combination with any of the above embodiments, in an embodiment the extractor circuit is further to apply a reduction with a polynomial to the intermediate randomized bit stream to yield the random output. In combination with any of the above embodiments, in an embodiment the extractor circuit is further to apply a Galois Field multiplication and addition operations to the intermediate randomized bit stream to yield the random output. In combination with any of the above embodiments, in an embodiment the extractor circuit includes a BIW extractor.

In some embodiments of the present inventions, a random number generator logic unit may include one or more entropy source circuits. In combination with any of the above embodiments, in an embodiment the entropy source circuits may include all-digital components to generate an initial randomized bit stream. In combination with any of the above embodiments, in an embodiment the random number generator logic unit may include one or more correlation circuits to remove correlations from the initial randomized bit stream to yield an intermediate randomized bit stream. In combination with any of the above embodiments, in an embodiment the system may include an extractor circuit to select a subset of the intermediate randomized bit stream as a random output of the random number generator logic unit. In combination with any of the above embodiments, in an embodiment the random output is to fulfill part of the instruction execution. In combination with any of the above embodiments, in an embodiment an entropy source may include a tunable delay circuit. In combination with any of the above embodiments, in an embodiment the tunable delay circuit is to adjust randomness output of the entropy source. In combination with any of the above embodiments, in an embodiment the entropy source may include a cross-coupled inverter pair to generate random output. In combination with any of the above embodiments, in an embodiment the correlation circuits are to combine an element from the initial randomized bit stream with previous bits received from the entropy source circuit. In combination with any of the above embodiments, in an embodiment the correlation circuits are to randomize the element with respect to a corresponding element from the previous bits to remove correlation. In combination with any of the above embodiments, in an embodiment the extractor circuit is further to select bits from bit ranges of the correlation circuit that do not overlap with each other in order to select the subset of the intermediate randomized bit stream. In combination with any of the above embodiments, in an embodiment the extractor circuit is further to apply a reduction with a polynomial to the intermediate randomized bit stream to yield the random output. In combination with any of the above embodiments, in an embodiment the extractor circuit is further to apply a Galois Field multiplication and addition operations to the intermediate randomized bit stream to yield the random output. In combination with any of the above embodiments, in an embodiment the extractor circuit includes a BIW extractor.

In some embodiments of the present inventions, an apparatus may include one or means for entropy generation. In combination with any of the above embodiments, in an embodiment the means for entropy generation may include all-digital components to generate an initial randomized bit stream. In combination with any of the above embodiments, in an embodiment the apparatus may include one or more correlation means to remove correlations from the initial randomized bit stream to yield an intermediate randomized bit stream. In combination with any of the above embodiments, in an embodiment the apparatus may include extractor means to select a subset of the intermediate randomized bit stream as a random output of the apparatus. In combination with any of the above embodiments, in an embodiment the random output is to fulfill part of the instruction execution. In combination with any of the above embodiments, in an embodiment an entropy means may include tunable delay means. In combination with any of the above embodiments, in an embodiment delay means is to adjust randomness output of the entropy source. In combination with any of the above embodiments, in an embodiment the entropy means may include an inverter means to generate random output. In combination with any of the above embodiments, in an embodiment the entropy means may include a cross-coupled inverter pair to generate random output. In combination with any of the above embodiments, in an embodiment the correlation means are to combine an element from the initial randomized bit stream with previous bits received from the entropy means. In combination with any of the above embodiments, in an embodiment the correlation means are to randomize the element with respect to a corresponding element from the previous bits to remove correlation. In combination with any of the above embodiments, in an embodiment the extractor means is further to select bits from bit ranges of the correlation means that do not overlap with each other in order to select the subset of the intermediate randomized bit stream. In combination with any of the above embodiments, in an embodiment the extractor means is further to apply a reduction with a polynomial to the intermediate randomized bit stream to yield the random output. In combination with any of the above embodiments, in an embodiment the extractor means is further to apply a Galois Field multiplication and addition operations to the intermediate randomized bit stream to yield the random output. In combination with any of the above embodiments, in an embodiment the extractor means includes a BIW extractor.

What is claimed is:

1. A processor, comprising:
   a front end to decode an instruction, the instruction to generate a random number;
   an execution unit;
   an allocator to assign the instruction to the execution unit to execute the instruction;
   wherein the execution unit includes:
      a plurality of entropy source circuits, wherein each of the plurality of entropy source circuits comprises all-digital components, and each of the plurality of entropy source circuits is to generate a respective initial randomized bit stream;
      a plurality of correlation circuits to generate a plurality of intermediate randomized bits streams from the initial randomized bit streams generated by the plurality of entropy source circuits, wherein each of the correlation circuits is to receive a respective one of the initial randomized bit streams and remove correlations from the received initial randomized bit stream to yield a respective intermediate randomized bit stream; and
      an extractor circuit to:
         receive the plurality of intermediate randomized bit streams; and
         generate, from the plurality of intermediate randomized bit streams, a random output of the execution unit, wherein the random output is to fulfill at least part of the instruction execution.

2. The processor of claim 1, wherein each of the plurality of entropy source circuits includes a tunable delay circuit, the tunable delay circuit to adjust randomness output of the entropy source circuit.

3. The processor of claim 1, wherein each of the entropy source circuits includes a cross-coupled inverter pair to generate random output.

4. The processor of claim 1, wherein each of the plurality of correlation circuits is to:
   combine an element from the corresponding initial randomized bit stream with previous bits received from the entropy source circuit; and
   randomize the element with respect to a corresponding element from the previous bits to remove correlation.

5. The processor of claim 1, wherein generating the random output comprises selecting bits from bit ranges of the plurality of correlation circuits that do not overlap with each other in order to select a subset of the plurality of intermediate randomized bit streams.

6. The processor of claim 1, wherein the extractor circuit is further to apply a reduction with a polynomial to the plurality of intermediate randomized bit streams to yield the random output.

7. The processor of claim 1, wherein the extractor circuit is further to apply a Galois Field multiplication and addition operations to the plurality of intermediate randomized bit streams to yield the random output.

8. A method, comprising:
   generating a plurality of initial randomized bit streams using a plurality of entropy source circuits, wherein each of the plurality of entropy source circuits includes all-digital components;
   removing correlations in the plurality of initial randomized bit streams using a plurality of correlation circuits to yield a plurality of intermediate randomized bit streams; and
   generating a random output of an execution unit from the plurality of intermediate randomized bits streams using an extractor circuit.

9. The method of claim 8, further comprising adjusting randomness output of the entropy source circuits with one or more tunable delay circuits.

10. The method of claim 8, wherein generating the plurality of initial randomized bit streams comprises routing outputs of each of a cross-coupled inverter pair to the respective inputs of each other.

11. The method of claim 8, further comprising, wherein generating the plurality of intermediate randomized bits streams comprises:
combining an element from one of the initial randomized bit streams with previous bits received from a corresponding one of the entropy source circuits; and
randomizing the element with respect to a corresponding element from the previous bits to remove correlation.

12. The method of claim 8, wherein generating the random output comprises selecting bits from bit ranges of the plurality of correlation circuits that do not overlap with each other in order to select a subset of the plurality of intermediate randomized bit stream.

13. The method of claim 8, further comprising, with the extraction circuit, wherein generating the random output comprises applying a Galois Field multiplication and addition operations to the intermediate randomized bit streams to yield the random output.

14. A random number generator logic unit, comprising:
a plurality of entropy source circuits, wherein each of the plurality of entropy source circuits comprises all-digital components, and each of the plurality of entropy source circuits is to generate a respective initial randomized bit stream;
a plurality of correlation circuits to generate a plurality of intermediate randomized bits streams from the initial randomized bit streams generated by the plurality of entropy source circuits, wherein each of the correlation circuits is to receive a respective one of the initial randomized bit streams and remove correlations from the received initial randomized bit stream to yield a respective intermediate randomized bit stream; and
an extractor circuit to:
receive the plurality of intermediate randomized bit streams; and
generate, from the plurality of intermediate randomized bit streams, a random output of the execution unit.

15. The random number generator logic unit of claim 14, wherein each of the plurality of entropy source circuits includes a tunable delay circuit, the tunable delay circuit to adjust randomness output of the entropy source circuit.

16. The random number generator logic unit of claim 14, wherein each of the entropy source circuits includes a cross-coupled inverter pair to generate random output.

17. The random number generator logic unit of claim 14, wherein each of the plurality of correlation circuits is to:
combine an element from the corresponding initial randomized bit stream with previous bits received from the entropy source circuit; and
randomize the element with respect to a corresponding element from the previous bits to remove correlation.

18. The random number generator logic unit of claim 14, wherein the extractor circuit is further to select bits from bit ranges of the correlation circuit that do not overlap with each other in order to select the subset of the intermediate randomized bit stream.

19. The random number generator logic unit of claim 14, wherein generating the random output comprises applying a reduction with a polynomial to the plurality of intermediate randomized bit stream to yield the random output.

20. The random number generator logic unit of claim 14, wherein the extractor circuit is further to apply a Galois Field multiplication and addition operations to the plurality of intermediate randomized bit streams to yield the random output.

* * * * *